US012792717B2

(12) United States Patent
Lancashire

(10) Patent No.: US 12,792,717 B2
(45) Date of Patent: Nov. 10, 2026

(54) COMPUTER CHALLENGE SYSTEMS BASED ON SHAPE COMBINATIONS

(71) Applicant: ARKOSE LABS HOLDINGS, INC., San Mateo, CA (US)

(72) Inventor: Murry Lancashire, Brisbane (AU)

(73) Assignee: Arkose Labs Holdings, Inc., San Mateo, CA (US)

( * ) Notice: Subject to any disclaimer, the term of this patent is extended or adjusted under 35 U.S.C. 154(b) by 243 days.

(21) Appl. No.: 18/183,246

(22) Filed: Mar. 14, 2023

(65) Prior Publication Data

US 2023/0297661 A1 Sep. 21, 2023

Related U.S. Application Data

(60) Provisional application No. 63/320,039, filed on Mar. 15, 2022, provisional application No. 63/269,850, filed on Mar. 24, 2022.

(51) Int. Cl.
*G06F 21/36* (2013.01)
*G06F 21/62* (2013.01)

(52) U.S. Cl.
CPC .............. *G06F 21/36* (2013.01); *G06F 21/62* (2013.01); *G06F 2221/2103* (2013.01); *G06F 2221/2133* (2013.01)

(58) Field of Classification Search
CPC .. G06F 21/36; G06F 21/62; G06F 2221/2103; G06F 2221/2133
USPC .............................................................. 726/7
See application file for complete search history.

(56) References Cited

U.S. PATENT DOCUMENTS

| | | | | |
|---|---|---|---|---|
| 2009/0150983 A1* | 6/2009 | Saxena | ................... | G06F 21/36 726/7 |
| 2010/0201478 A1* | 8/2010 | Veen | ....................... | H04L 67/52 340/3.1 |
| 2012/0084450 A1* | 4/2012 | Nagamati | ............... | G06F 21/31 709/229 |
| 2013/0106916 A1* | 5/2013 | Guo | ........................ | G06F 21/36 345/672 |
| 2015/0317700 A1* | 11/2015 | Ford | .................. | G06Q 30/0277 705/71 |
| 2020/0134159 A1* | 4/2020 | Ford | ........................ | G06F 21/31 |
| 2022/0303272 A1* | 9/2022 | Ford | ..................... | G06F 3/0482 |

* cited by examiner

*Primary Examiner* — Jacob Lipman

(74) *Attorney, Agent, or Firm* — Womble Bond Dickinson (US) LLP

(57) ABSTRACT

A method includes sending a challenge data structure to a user computer system. The challenge data structure defines a challenge user interface to be presented to a user of the user computer system. The challenge user interface includes a key shape and a key number, and prompts the user to select a correct image from a plurality of images. Each of the images includes a combination of shapes, and the correct image comprises a first shape of the shapes that corresponds to the key shape and has a same number of the first shape as the key number. The method includes obtaining a user input to the challenge user interface that represents a selection of at least one image from the images, and providing access to the computer resource for the user computer system based on whether the at least one image is consistent with the correct image.

18 Claims, 25 Drawing Sheets

COMPUTER CHALLENGE SYSTEMS BASED ON SHAPE COMBINATIONS

CROSS-REFERENCE TO RELATED APPLICATIONS

This application claims the benefit of U.S. Provisional Application No. 63/320,039, filed on Mar. 15, 2022, and U.S. Provisional Application No. 63/269,850, filed on Mar. 24, 2022, the entire contents of each of which are hereby incorporated by reference herein.

FIELD

The present disclosure generally relates to controlling access to computer resources to limit automated and unintended accessing of the computer resources. The disclosure relates more particularly to apparatus and techniques for presenting challenges to users that utilize images.

BACKGROUND

Computer resources are often created for access by humans and the creators may seek to reduce or block access to those computer resources when the access is by unintended users such as an automated process that is attempting access or by unintended human users who may be attempting to access the computer resources in ways unintended or undesired by their creators. For example, a web server serving web pages related to a topic may be set up for human users to browse a few pages but not set up for an automated process to attempt to browse and collect all available pages or for persons employed to scrape all of the data. As another example, a ticket seller may wish to sell tickets to an event online, while precluding unauthorized resellers from using an automated process to scrape data off the ticket seller's website and buy up large quantities of tickets.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
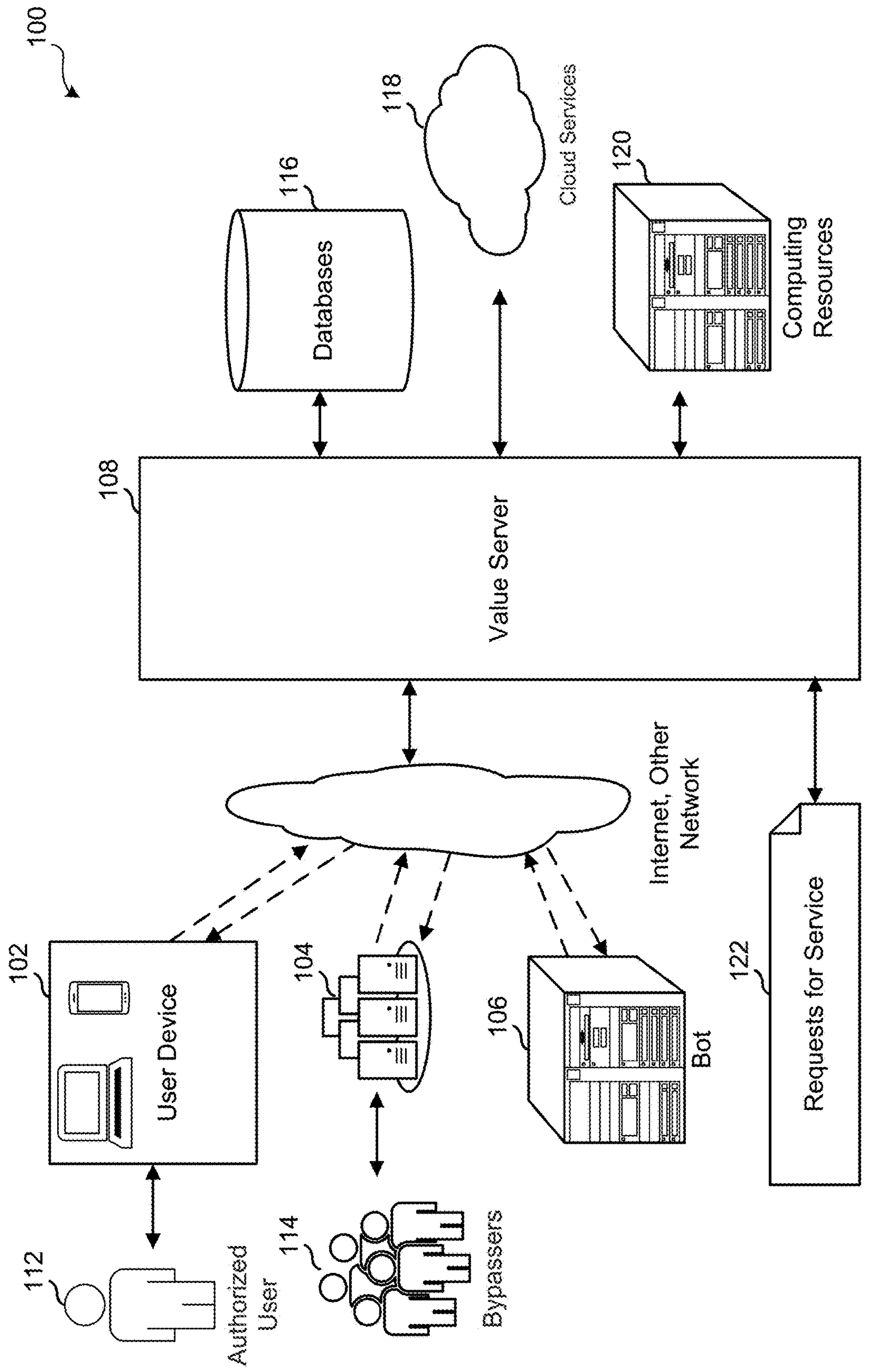
FIG. 1 is a block diagram of a network environment wherein an authentication challenge system may be deployed, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Unauthorized access and/or unwanted access to computer resources may be used to cause damage, such as highly-repetitive access to a computer resource in order to block others from accessing it, causing servers to crash, flooding comment sections with messages, creating a large number of fictitious identities in order to send spam or bypass limits, skewing results of a vote or poll, entering a contest many times, brute force guessing of passwords or decryption keys, or the like. In some cases, systems may perform user authentication, such as presenting authentication challenges in order to distinguish authorized users of a computing asset from unauthorized users. Unauthorized users may include unauthorized human users, users attempting to bypass controls ("bypassers"), and/or unauthorized automated agents.

A provider of computer resources may wish to determine whether a given user accessing those computer resources is a legitimate human user, an automated process, or a bypasser, given that access to the resources would be computer-mediated in each case. For example, companies and other organizations may create materials and make them available online, sometimes via intermediaries that charge per view. These organizations may spend huge sums, or make significant efforts, in creating and disseminating these materials, but wish to ensure that real, human consumers in their target audience view particular materials, as automated agents can generate false impressions that someone in the target audience has viewed the materials when in fact no real human in the target audience has done so. In some cases, there may be humans accessing that content, but not be in the target audience, such as someone deployed to access the content without viewing the materials. Companies and other organizations lose the effect of the money they pay by spending for these false impressions by unintended users, whether human or not.

Techniques described and suggested herein solve these and other problems by presenting computer authentication challenges and processing responses to computer authentication challenges. An authentication challenge may be issued and managed by an authentication program or system used to ensure that information entered into a computer, such as via a web site, is entered by a human user of a computing device rather than by an automated program commonly known as a bot or an agent. Agents are commonly used by computer hackers in order to gain illicit entry to web sites, or to cause malicious damage, for example by creating a large amount of data in order to cause a computer system to crash, by creating a large number of fictitious membership accounts in order to send spam, by skewing results of a vote or poll, by entering a contest many times, or by guessing a password or decryption key through a brute force method, etc. Thus, it can be desirable to detect such activities to block or limit them.

One example of such a user authentication program may present a string of arbitrary characters to a user and prompt the user to enter the presented characters. If the user enters the characters correctly, the user is allowed to proceed. Automated agents that have adapted to include character recognition may be able to circumvent such authentication programs. Authentication programs such as CAPTCHA ("Completely Automated Public Turing test to tell Computers and Humans Apart") programs have been developed to disguise text characters, for example by adding background noise, or randomly positioning the characters on the screen, rather than in pre-defined rows. Although such programs are successful at preventing some agents from accessing a computer, it also can be difficult for authorized human users to read such disguised characters. As such, character-based CAPTCHA authentication programs often can be frustrating and tedious to use.

Authentication programs may be able to be bypassed by somewhat sophisticated agents that can determine the requested answer despite the disguise. As such, character-based CAPTCHA authentication programs often fail to prevent automated abuse of the protected computer system.

Another example of a user authentication program may present a grid of photographs to a user and prompt the user to select one or more photographs that meet a stated criterion (e.g., "From the displayed pictures, select those that contain construction vehicles"). Although such programs can be successful at preventing some agents from accessing a computer, it also can be difficult for human users to decide whether the instruction applies or does not apply to photographs with ambiguous contents, such as whether a consumer-grade sports utility vehicle should be regarded as a construction vehicle. As a result, photo-based CAPTCHA authentication programs often can be frustrating and tedious to use for authorized users.

Such authentication programs may be able to be bypassed by somewhat sophisticated agents that can automatically recognize the contents of photographs and so such photo-based CAPTCHA authentication programs that rely solely on image recognition can fail to prevent automated abuse of the protected computer system.

An authentication system that can be bypassed by a merely somewhat sophisticated agent can motivate computer hackers to invest a small amount of labor to create such an agent, provided that the reward for bypassing the authentication system is greater than the investment that must be made to create the agent. On the other hand, an authentication system that can only be bypassed by a highly sophisticated agent may discourage computer hackers from investing the large amount of labor needed to create such an agent, as the reward for bypassing the authentication system may be smaller than the investment that must be made to create the agent.

Authentication system design therefore often takes into account these considerations, to provide a method and system for user authentication that is both easy for authorized users to pass without frustration and tedium and very difficult for unauthorized users, or at least create enough of a cost for unauthorized users to discourage investment of labor into creating a work-around.

In an example hardware system according to some embodiments of the present disclosure, an authentication challenge system may be coupled with a value server that serves or manages some protected computer resource that can be accessed by user devices and is to be protected by the authentication challenge system against unauthorized user device access while permitting authorized user devices to access the value server, to some level of protection. The level of protection may not be absolute in that some authorized user devices may be blocked from access and some unauthorized user devices may obtain access.

FIG. 1 is a block diagram of a network environment 100 wherein an authentication challenge system may be deployed, according to an embodiment. In the example shown in FIG. 1, a user device 102, a set of bypasser devices 104, and a bot 106 may be attempting to obtain services from a value server 108. It is assumed in this example that a user 112 operating user device 102 is an authorized user to whom an operator of value server 108 is willing to provide services, whereas the operator is not willing to provide services to bypassers 114 using the set of bypasser devices 104 or to bot 106. The particular services provided are not necessarily relevant to processes of trying to allow authorized access and trying to prevent unauthorized access, but examples are illustrated, including databases 116, cloud services 118, and computing resources 120. Those services may include serving webpages and interactions with users. Various devices may send requests 122 for services and receive in response the requested services, receive a challenge (possibly followed by the requested services if the challenge is met), or receive a rejection message. As explained herein, the challenge could be a process that is designed to filter out requesters based on an ability to meet a challenge, where meeting the challenge requires some real-world experience and/or knowledge not easily emulated by a computer—thus potentially blocking bot 106 from accessing services—and that is potentially time-consuming for bypassers 114 to work on—thus potentially making the requests economically infeasible for a hired set of bypassers 114 or other bypassers 114 who may not be interested in the requested services as much as bypassing controls for others or for various reasons, all while limiting a burden on an authorized legitimate user (e.g., authorized user 112) of the services.

Figure 2:
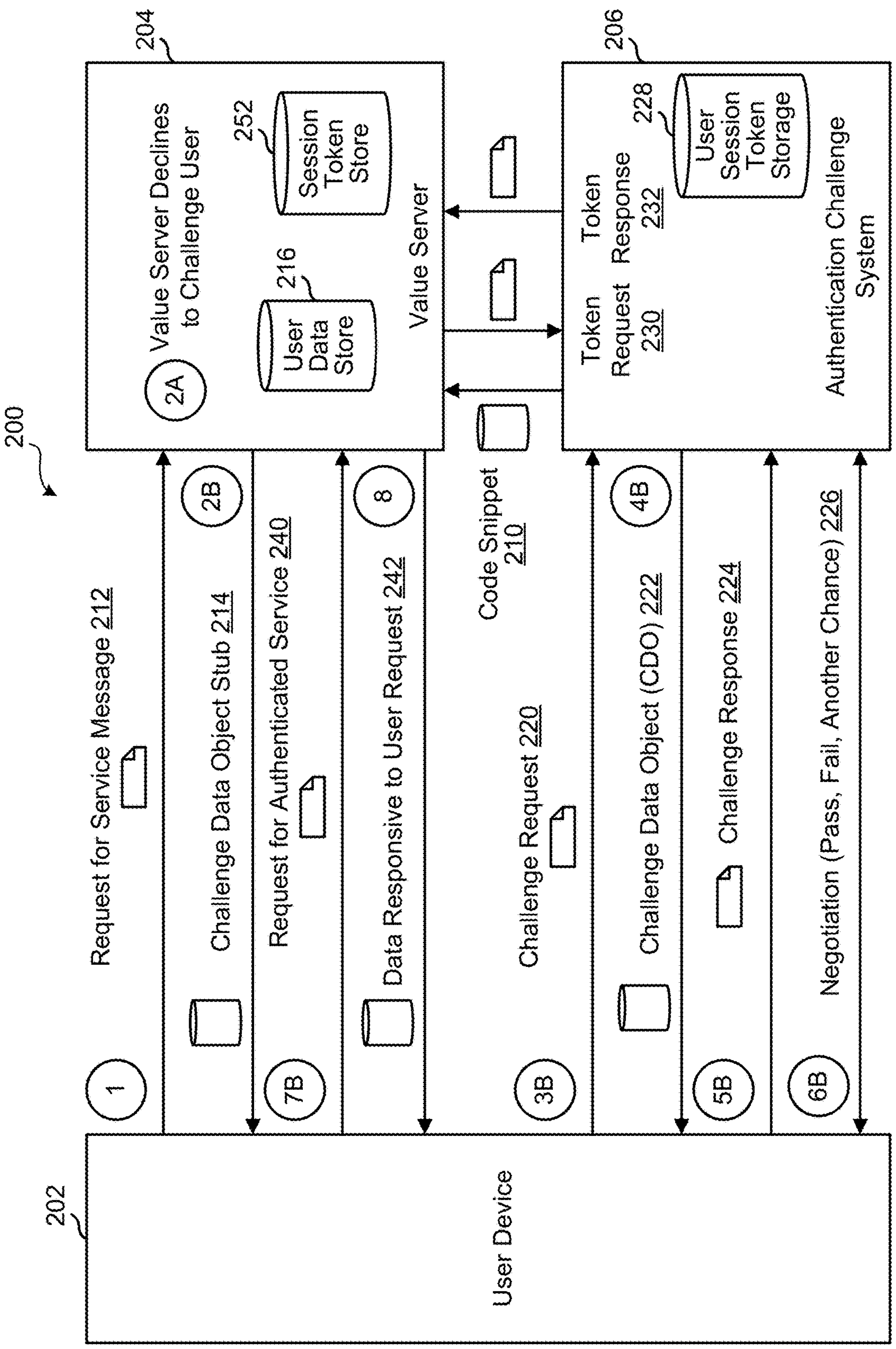
FIG. 2 is a block diagram of an authentication challenge system and exemplary components, according to an embodiment of the present disclosure.

FIG. 2 is a block diagram of an authentication challenge system 200 and example components, according to an embodiment. Messages and data objects that are passed among components are shown in greater detail than in FIG. 1, but user device 202 in FIG. 2 may correspond to user device 102 in FIG. 1, a bypasser device 104 of FIG. 1, or bot 106 of FIG. 1, while value server 204 may correspond to value server 108 of FIG. 1. That said, those like components may be different or differently configured.

Also illustrated in FIG. 2 are indicators of a typical order of operations of communications among user device 202, value server 204, and an authentication challenge system 206. It should be noted that other orders of operations may be taken, and some operations may be omitted or added. In a precursor operation, authentication challenge system 206 may supply value server 204 a code snippet 210 usable by value server 204 for handling challenges.

In an operational process illustrated, user device 202 may send a "request for service" message 212 to value server 204 (referenced as communication "1"). Value server 204 may then determine whether a challenge is to be provided and either declines to challenge the user device 202 making the request (communication 2A) or to challenge the user device 202 making the request. For example, where user device 202 is already logged in and authenticated to value server 204, value server 204 may have enough information to be able to skip a challenge process and may respond to the user request immediately without requiring further authentication.

In the case where value server 204 decides to challenge, value server 204 may send (communication 2B) a challenge data object (CDO) stub 214 to user device 202. CDO stub 214 may have been supplied as part of code snippet 210 from the authentication challenge system 206. In some embodiments, what is sent is an entire CDO as explained herein elsewhere. In some embodiments, as explained herein elsewhere, CDO stub 214 may include information about the user or the request and such information may be encrypted or signed such that user device 202 cannot easily alter the information without that alteration being detected. Such information may include details about the user that are known to value server 204, such as an IP address associated with the request, country of origin of the request, past history of the user, if known, etc. This data may be stored as user data in user data store 216.

CDO stub 214 may be code, a web page, or some combination that is designed to have user device 202 issue a challenge request 220 (communication 3B). For example, CDO stub 214 may be code that generates and transmits challenge request 220, or it may be a web page that is displayed by user device 202, perhaps with a message like "Click on this line to get validated before you can access the requested resource" with the link directed to authentication challenge system 206. In response to receiving challenge request 220, authentication challenge system 206 may respond (communication 4B) with a challenge data object (CDO) 222, example structures of which are detailed herein elsewhere.

CDO 222 may include code, a web page, or some combination that can be processed by user device 202 to present a challenge to a user of user device 202. Authentication challenge system 206 may then await a response from user device 202, typically while handling other activities asynchronously. User device 202 may send a challenge response 224 (communication 5B) to authentication challenge system 206. The challenge response 224 may be a result of input provided by the user of the user device 302. For example, the challenge response 224 may be generated in response to interaction of one or more input devices (e.g., a keyboard, mouse, touch screen, speaker, etc.) of the user device 202. As explained elsewhere herein, authentication challenge system 206 can process challenge response 224 in light of CDO 222 and evaluate whether the user satisfied the challenge represented in CDO 222 and then engage in a negotiation 226 (explained in more detail below) with user device 202 (communication 6B).

If authentication challenge system 206 determines that the challenge was met, communication 6B (negotiation 226) can be in the form of a "pass" message, while if authentication challenge system 206 determines that the challenge was not met, communication 6B can be in the form of a "fail" message. Another alternative is a message indicating that the user has additional chances to try again, perhaps with a new challenge included with such alternative message (e.g., "Your answer did not seem right, given the challenge. Click here to try again.").

Challenge response 224 and/or challenge request 220 may include information from value server 204 that passed through user device 202, perhaps in a secured form. That information may allow authentication challenge system 206 to identify the user and a user session for which the challenge is to apply. Authentication challenge system 206 may then store a user session token in user session token storage 228 indicating the results of the challenge. Then, when value server 204 sends a token request 230 identifying the user and user session, authentication challenge system 206 can reply with a token response 232 indicating whether the user met the challenge, and possibly also that the user did not meet the challenge or that the user never requested a challenge or responded to one.

The CDO stub 214 may be such that the user device 202 may send a request for authenticated service to value server 204, such as a webpage portion that instructs "Once you are authenticated, click here to proceed to your desired content" or the like in the form of a request for authenticated service 240 (communication 7B), which can signal to value server 204 that the user is asserting that they have completed the challenge. Of course, value server 204 need not trust the assertion, but may then be aware that authentication challenge system 206 may indicate that the challenge was indeed correctly responded to. Request for authenticated service 240 may be sent by user device 202 without user interaction after user device 202 receives a success message related to negotiation 226.

At this point, value server 204 can send token request 230 to authentication challenge system 206 and receive token response 232 from authentication challenge system 206. In some embodiments, value server 204 may wait a predetermined time period and send token request 230 without waiting for a signal from user device 202. In such embodiments, user device 202 may not send a request for authenticated service after its initial request. In some embodiments, authentication challenge system 206 may delay sending token response 232 if authentication challenge system 206 is involved in processing a challenge with user device 202 such as when the user has not yet requested a challenge or has failed a challenge but is given another chance, so that authentication challenge system 206 can ultimately send a token response indicating a successful response to the challenge.

In any case, value server 204 may respond with data 242 responsive to the user request (communication 8). If authentication challenge system 206 can independently determine that user device 202 is operated by an authorized user, then authentication challenge system 206 may store a user session token in user session token storage 228 indicating that a challenge was met. In that case, the timing of receiving token request 230 may be less important, as authentication challenge system 206 would be ready to respond at any time.

A number of examples of challenges are described in detail herein, including possible user responses that could be conveyed in challenge response messages. While just one challenge process was described in detail, it should be understood that value server 204 may process many requests in parallel and interact with more than one authentication challenge system and authentication challenge system 206 may process requests from many user devices in parallel and interact with many value servers.

Challenge response message 224 may include, in addition to an indication of the user's response to the challenge, a challenge identifier that identifies CDO 222 that was sent to challenge the user, in which case authentication challenge system 206 can easily match up the response with the challenge to determine if the response is consistent with an answer key for the specific challenge given.

Once value server 204 receives token response 232 and token response 232 indicates that the user is authenticated and not an undesired user, value server 204 can determine its next operation. Value server 204 may also store token response 232 into a session token store 252 usable for handling subsequent requests from the user. At this point in the process, whether value server 204 determined that no challenge was to be provided (communication 2A) or determined a challenge was to be provided and has a token response indicating that the challenge was met, value server 204 can respond to the request of the user device 202.

In some embodiments of the process, the processing may be done in a time period similar to a time period normally required for processing service requests. In other words, it could appear to the user that the processing is quick, except for the time the user takes to mentally process and respond to the challenge presented. As explained herein below, CDOs may be created in advance for quick deployment.

In the example shown in FIG. 2, a value server is configured to handle some of the authentication processes. Another variation could be used where the value server does not handle any authentication and may not even be aware it is happening. This may be useful for securing legacy systems.

Figure 3:
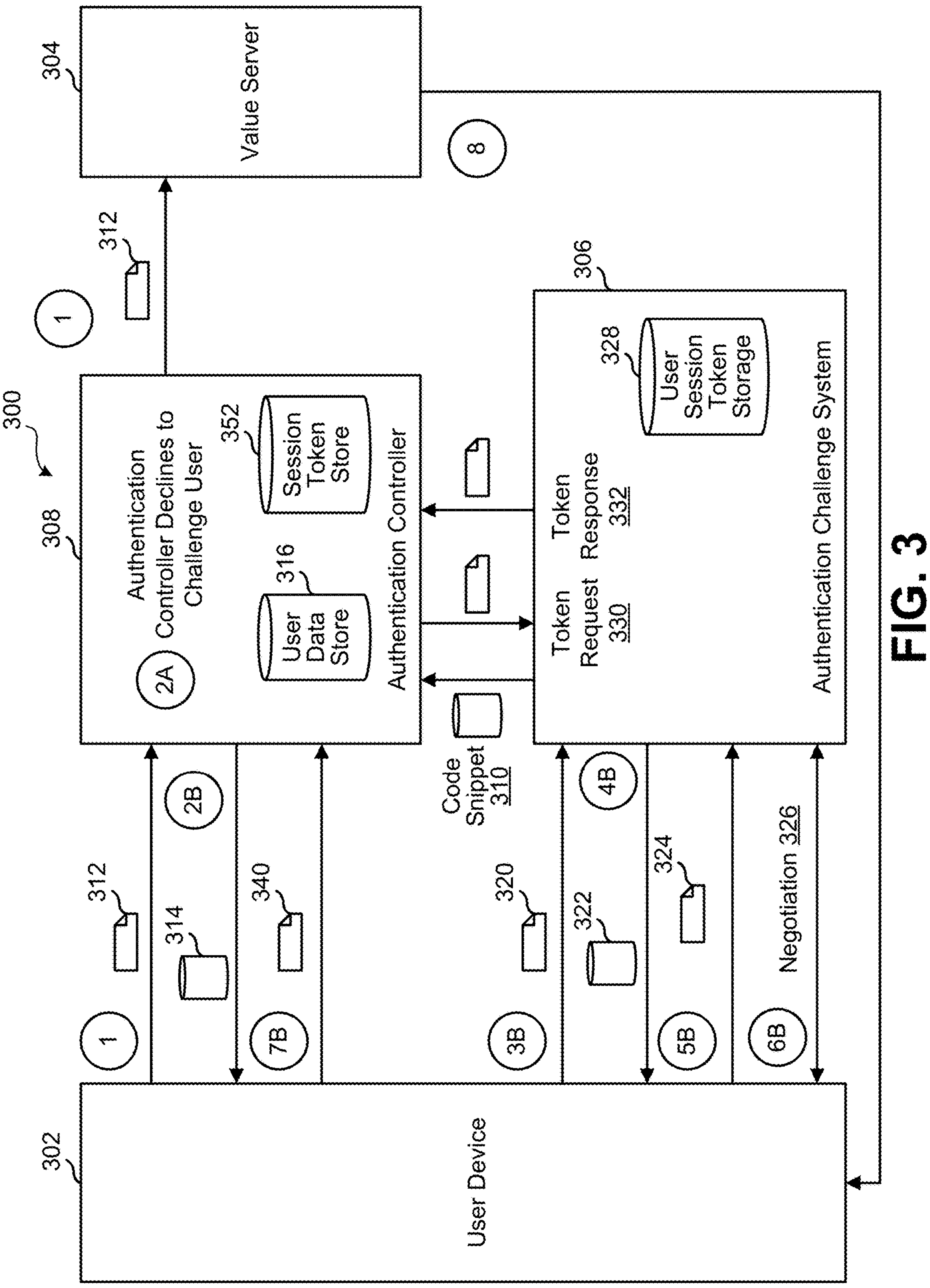
FIG. 3 is a block diagram of a system in which a value server is secured using an authentication controller for access control, in accordance with some embodiments of the present disclosure.

FIG. 3 is a block diagram of a system 300 in which a value server 304 is secured using an authentication controller for access control such that requests from a user device 302 can be limited, mostly, to requests from authorized users. As shown there, an authentication challenge system 306 and an authentication controller 308 together operate to control access of user device 302 to value server 304. As illustrated, a communication 1 comprises a request for services 312 from user device 302 to authentication controller 308 and may be a request similar to other requests described herein.

Also illustrated in FIG. 3 are indicators of a typical order of operations of communications among user device 302, value server 304, authentication challenge system 306, and authentication controller 308. It should be noted that other orders of operations may be taken, and some operations may be omitted or added. In a precursor operation, authentication challenge system 306 may supply authentication controller 308 a code snippet 310 usable by authentication controller 308 for handling challenges. In some embodiments, authentication challenge system 306 and authentication controller 308 are integrated.

In an operational process illustrated, user device 302 sends a "request for service" message 312 towards value server 304 (communication 1), which is either intercepted by authentication controller 308 or passed through to value server 304. As with value server 204 of FIG. 2, authentication controller 308 determines whether a challenge is to be provided and either declines to challenge the user device 302 making the request (communication 2A) or to challenge the user device 302 making the request, possibly relying on user data in a user data store 316.

In the case where authentication controller 308 decides to challenge, authentication controller 308 sends a challenge data object (CDO) stub 314 to user device 302 (communication 2B). CDO stub 314 may be code, a web page, or some combination that is designed to have user device 302 issue a challenge request 320 (communication 3B) to authentication challenge system 306, similar to CDO stub 214 shown in FIG. 2. In response to receiving challenge request 320, authentication challenge system 306 may respond (communication 4B) with a challenge data object (CDO) 322, similar to CDO 222 of FIG. 2. Authentication challenge system 306 may then await a response from user device 302, typically while handling other activities asynchronously. User device 302 may send a challenge response 324 (communication 5B) to authentication challenge system 306. The challenge response 324 may be a result of input provided by the user of the user device 302. For example, the challenge response 324 may be generated in response to interaction of one or more input devices (e.g., a keyboard, mouse, touch screen, speaker, etc.) of the user device 302. Authentication challenge system 306 can process challenge response 324 in light of CDO 322 and evaluate whether the user satisfied the challenge represented in CDO 322 and then engage in a negotiation 326 with user device 302 (communication 6B).

If authentication challenge system 306 determines that the challenge was met, communication 6B (negotiation 326) can be in the form of a "pass" message, while if authentication challenge system 306 determines that the challenge was not met, communication 6B can be in the form of a "fail" message. Another alternative is a message indicating that the user has additional chances to try again, perhaps with a new challenge included with such alternative message.

Challenge response 324 and/or challenge request 320 may include information from authentication controller 308 that passed through user device 302, perhaps in a secured form. That information may allow authentication challenge system 306 to identify the user and a user session for which the challenge is to apply. Authentication challenge system 306 may then store a user session token in user session token storage 328 indicating the results of the challenge. Then, when authentication controller 308 sends a token request 330 identifying the user and user session, authentication challenge system 306 can reply with a token response 332 indicating whether the user met the challenge, and possibly also that the user did not meet the challenge or that the user never requested a challenge or responded to one. Authentication challenge system 306 and/or authentication controller 308 may have logic to delay token request 330 and/or token response 332 to give the user time to complete a challenge but can send token request 330 after receiving a request for authenticated service 340 (communication 7B). For example, authentication challenge system 306 may wait ten seconds after receiving token request 330 before responding with token response 332 if the user has not yet requested a challenge or has failed a challenge but is given another chance. Authentication controller 308 may have logic to delay sending token request 330 to give the user some time to complete a challenge process with authentication challenge system 306.

If authentication challenge system 306 can independently determine that user device 302 is operated by an authorized user, then authentication challenge system 306 may store a user session token in user session token storage 328 indicating that a challenge was met. While just one challenge process was described in detail, it should be understood that authentication controller 308 may process many requests in parallel and interact with more than one authentication challenge system and more than one value server and authentication challenge system 306 may process requests from many user devices in parallel and interact with many authentication controllers.

Challenge response 324 may include, in addition to an indication of the user's response to the challenge, a challenge identifier that identifies CDO 322 that was sent to challenge the user, in which case authentication challenge system 306 can easily match up the response with the challenge to determine if the response is consistent with an answer key for the specific challenge given.

Once authentication controller 308 receives token response 332 and token response 332 indicates that the user is authenticated and not an undesired access, authentication controller 308 can determine its next operation. Authentication controller 308 may also store token response 332 into a session token store 352 usable for handling subsequent requests from the user. At this point in the process, whether authentication controller 308 determined that no challenge was to be provided (2A) or determined a challenge was to be provided and has a token response indicating that the challenge was met, authentication controller 308 can forward the user's request to value server 304, which may respond (communication 8) to user device 302 as if no authentication took place.

As with embodiments where a value server handles some of the tasks, all of the processing may be done in a time period similar to a time period normally required for processing service requests and CDOs may be created in advance for quick deployment. In some of these operations and examples, the communication and/or message or data sent corresponds to what is depicted in FIG. 3 and described herein.

An authentication challenge system may have multiple components, such as a decision server that decides whether a user device should be challenged, a response processor that evaluates user responses to challenges, a challenge server that outputs and manages challenges, a challenge creation system usable for creating challenges and classes of challenges, and an authentication access system that controls whether the user device obtains access to the value server. Some of these components may be integrated into a single system, such as where the challenge processor and decision server are integrated, the challenge processor and response processor are integrated, or all three are integrated.

Figure 4:
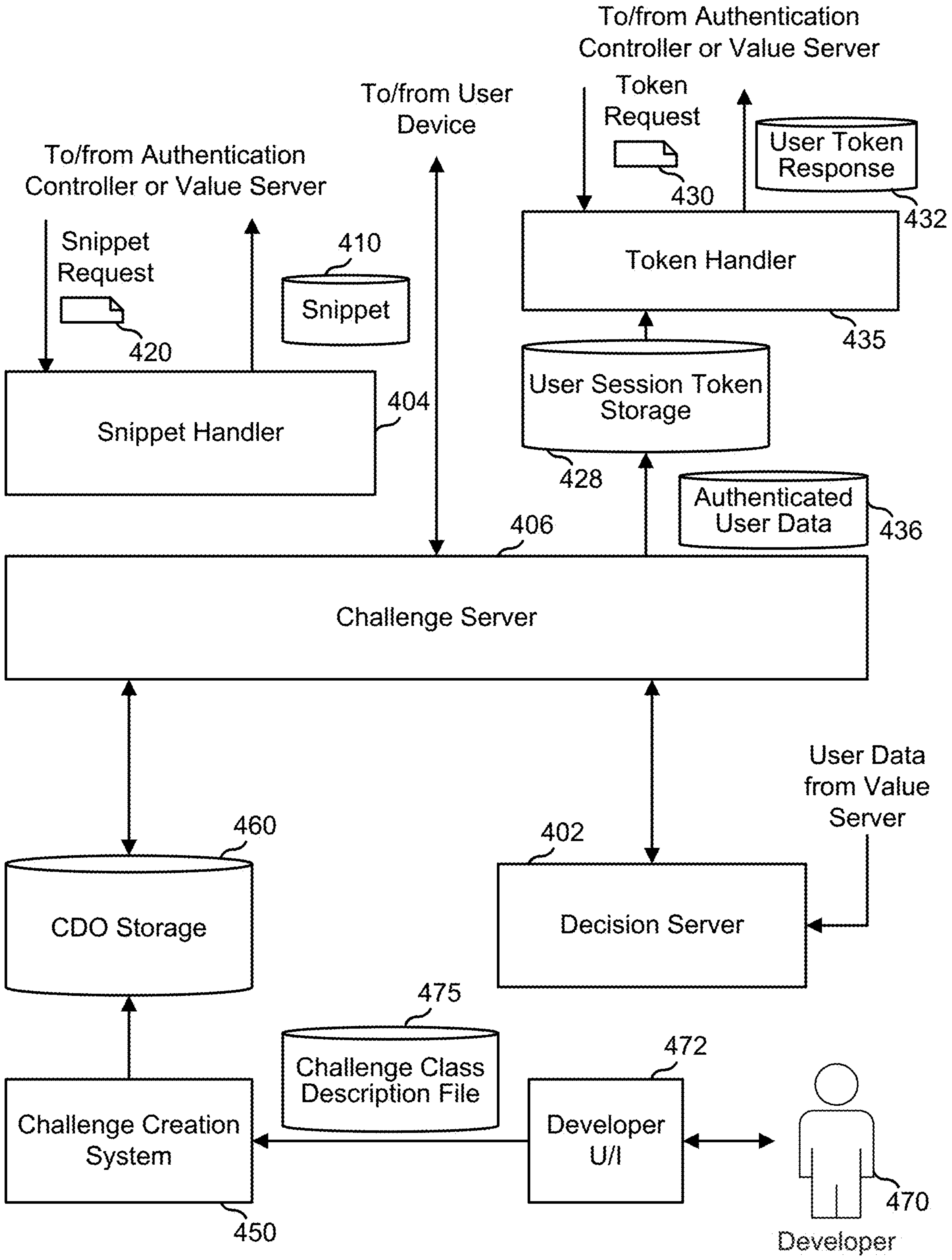
FIG. 4 is a block diagram of an authentication challenge system in an embodiment of the present disclosure.

FIG. 4 is a block diagram of an authentication challenge system in an embodiment. As illustrated there, an authentication challenge system may include a snippet handler 404 that receives a snippet request 420 from a value server or an authentication controller and responds with a code snippet 410, such as code snippets 210 and 310 (in FIGS. 2-3). A challenge server 406 may receive and respond to messages from a user device (as detailed in FIG. 5). A token handler 435 may receive token requests 430 from a value server or an authentication controller and respond with a token response 432, such as token requests 230, 330 and token responses 232, 332 in FIGS. 2-3, in response to data read from a user session token storage 428. The challenge server 406 may provide user session data 436 for the user session token storage 428.

As shown, the challenge server 406 may interact with a decision server 402 that decides whether to challenge a user, perhaps based in part on user data received from a value server or an authentication controller. The challenge server 406 may interact with a CDO storage 460 to retrieve CDOs to provide to user devices. The CDO storage 460 may be pre-populated with CDOs for quick response. Those CDOs may be created in advance by a challenge creation system 450. A developer 470 may develop classes of challenges using a developer user interface 472 to create challenge class description files 475 that the challenge creation system 450 can use to generate large numbers of distinct CDOs. By being able to create large numbers of distinct CDOs from one challenge class description file 475, the labor effort per CDO can be reduced, allowing for many more distinct challenges (which may be more work for bypassers to try and work around) without requiring much more work on the part of developers 470.

Figure 5:
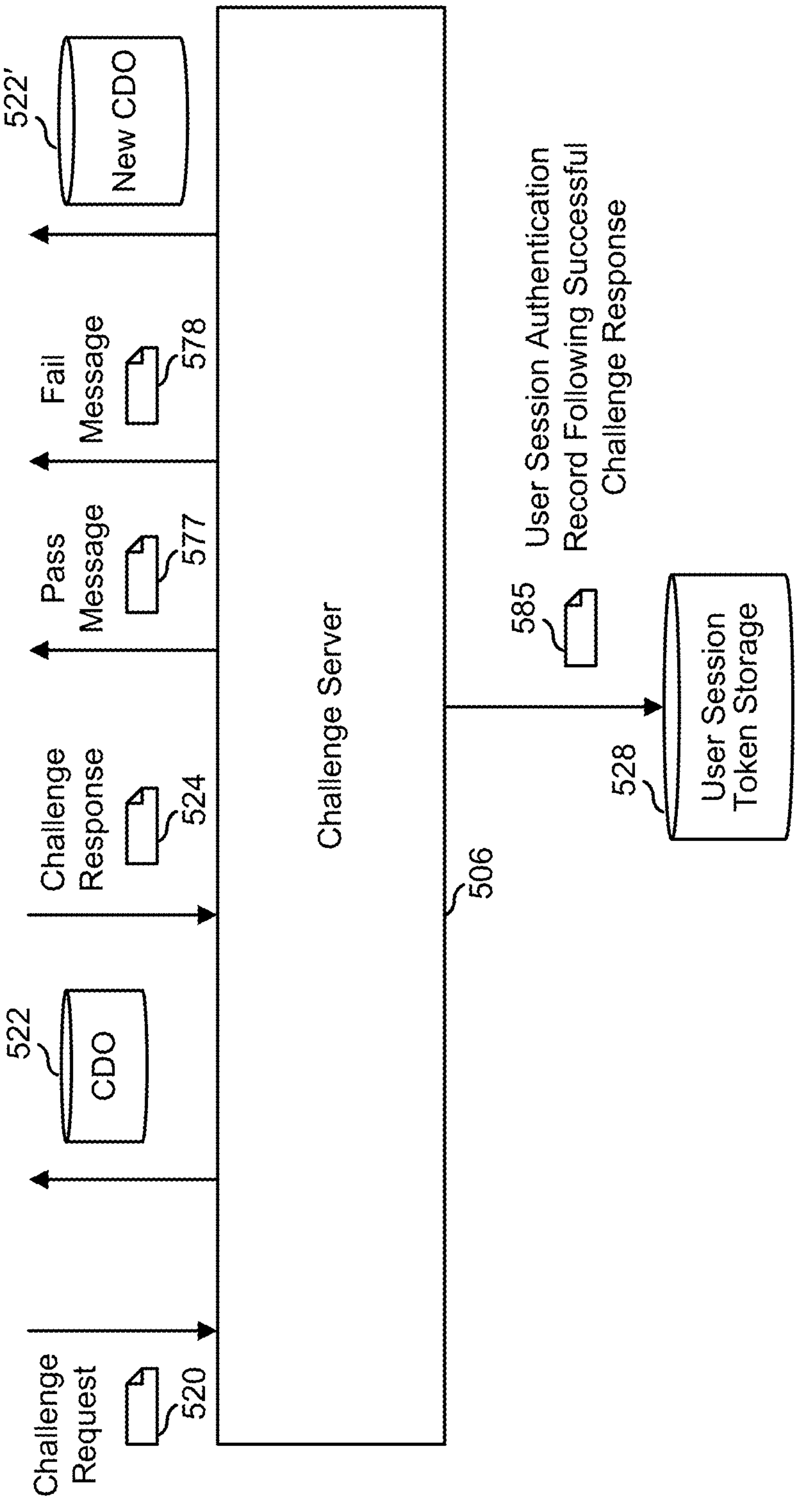
FIG. 5 is a block diagram showing user interactions with the challenge server, in an embodiment of the present disclosure.

FIG. 5 is a block diagram showing user interactions with the challenge server 506, in an embodiment. The challenge server 506 may be similar to that of the challenge server 406 of FIG. 4. As shown in FIG. 5, a user device (e.g., user device 202 or 302 of FIGS. 2 and 3) may send a challenge request 520 to the challenge server 506, which may respond with a CDO 522. The user device may send a challenge response 524, perhaps formatted so that the challenge server 506 can determine the corresponding CDO 522 or at least whether the challenge response 524 is a valid response. The challenge server 506 may then send the user device a "pass" message 577, a "fail" message 578, or a new CDO 522' giving the user a chance to respond to a new challenge. Where the user device provides a valid and correct challenge response 524, the challenge server 506 may then store a user session authentication record 585 into a user session token storage 528.

Figure 6:
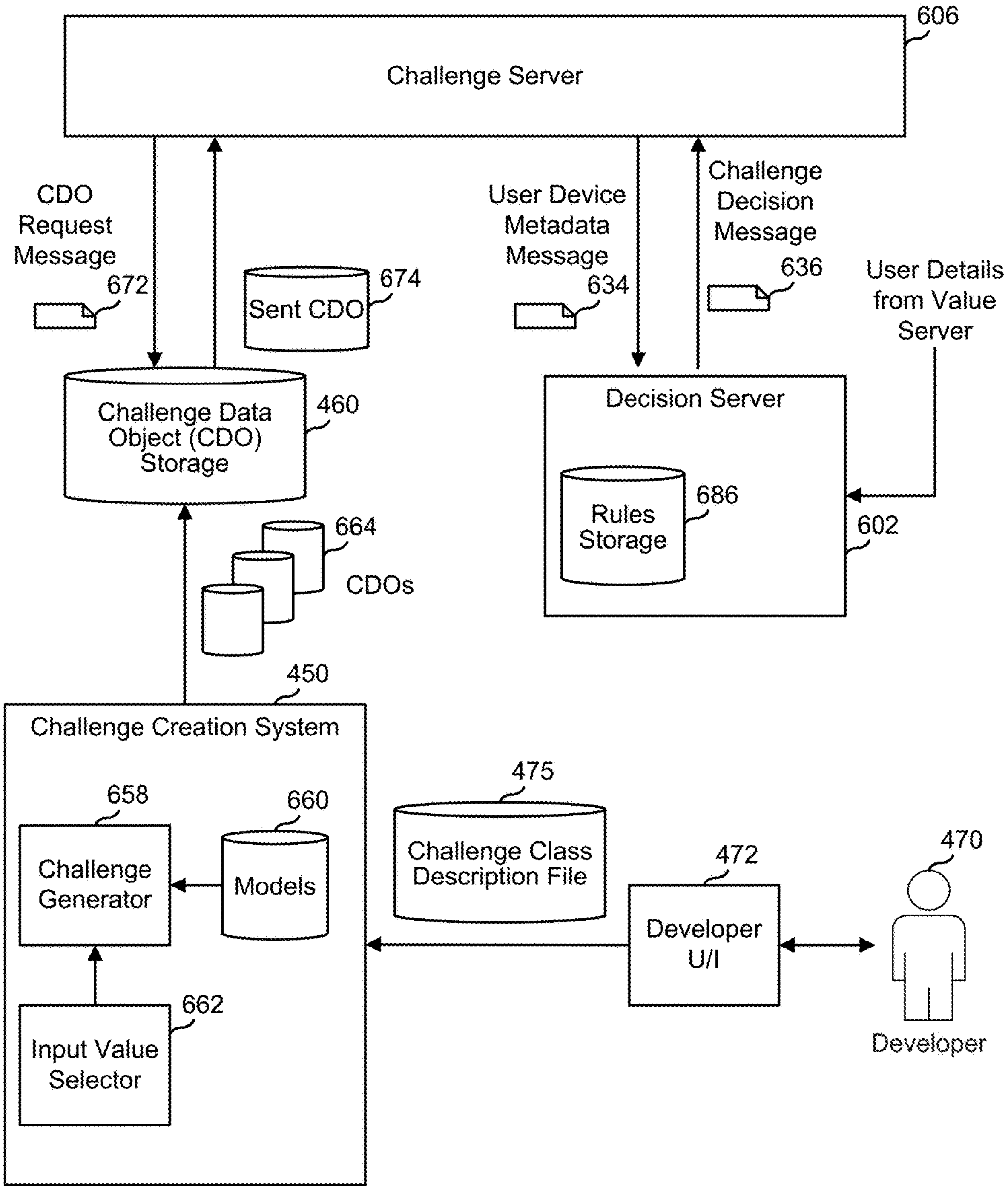
FIG. 6 illustrates internal operations of an authentication challenge system in greater detail, in an embodiment of the present disclosure, considering FIGS. 4-5 in context.

FIG. 6 illustrates internal operations of an authentication challenge system in greater detail, in an embodiment, considering FIGS. 4-5 in context. As shown there, a developer 470 may use a developer user interface 472 to generate a challenge class description file 475 and provide that to a challenge creation system 450, which may comprise a challenge generator 658 that receives input value selections from an input value selector 662 and models from a model store 660. With this approach, challenge creation system 450 can generate a large number of CDOs 664 from challenge class description file 475 and those can be stored into a CDO storage 460.

A challenge server 606 may send a CDO request message 672 to CDO storage 460, perhaps in response to a user's challenge request. CDO storage 460 may reply to challenge server 606 with a CDO 674. Challenge server 606 may send a user device metadata message 634 to a decision server 602 and get back a challenge decision message 636 indicating whether a user should be challenged. A decision by decision server 602 may be based on rules stored in a rules storage 686, which may be rules as described herein elsewhere, and/or based on user data from a value server and/or an authentication controller.

Attempts to access the protected computer resource may be made by various users. Typically, the operator of the computer resource may want to allow legitimate users to access the computer resource, while blocking bypassers (users who may be attempting to access the computer resource in ways undesired or unintended by the operator, such as being employed to bypass legitimate controls, and/or masquerade as genuinely interested customers) and automated users, such as bots (automated processes that may be attempting to access the computer resource in ways undesired or unintended by the operator). In such cases, the operator may set up the computer resource on a value server and have access to that value server controlled by an authentication access system of an authentication challenge system.

An authentication access system may serve as a gatekeeper to a computer resource protected by the authentication challenge system and/or may provide a recommendation or result to another system that controls the computer resource. Thus, the authentication access system may block what is determined to be an access by an unintended user and allow what is determined to be an access by a legitimate user or may just provide messaging to other systems that may result in such access controls.

Protection of computer resources may comprise giving legitimate users easy access the computer resource while blocking unintended users (e.g., bypassers and bots) or at least making access more difficult for unintended users. The computer resource may be a server providing content (e.g., a web server serving web pages), an e-commerce server, an advertising-supported resource, a polling server, an authentication server, or other computer resource. The computer resource may be data, communications channels, computing processor time, etc. In part, a role of the authentication challenge system is to try and determine what kind of user is attempting an access and selectively put up roadblocks or impediments for unintended users.

A value server may provide computer resources, or access thereto, to a user having a user device. The user device may be a computer device the user uses to connect to the value server. The value server can issue to the user device a demand for the user to successfully complete a challenge before the value server issues to the user the service of value. In some embodiments, the value server sends the user device a message indicating that the user device should contact an authentication challenge system, obtain an access token (which the authentication challenge system would presumably only supply if it deemed the user successful in a challenge), and provide the access token to the value server in order to access desired assets.

The nature of the user device may not be apparent to the value server or other components of the authentication challenge system, but those components may be configured as if the user device is a user device that can be operated by an automated process or by a human process. For example, responses to challenges may be received that could have been generated by an automated process or by a human.

A decision server determines whether a user system is to be challenged and, if so, what class, level, and/or type of challenge to use. The decision server may respond to a request from a value server or a request from a user system, perhaps where the user system is sending the request to the decision server at the prompting of the value server. The value server may send the decision server a set of user properties that may be known to the value server but not necessarily knowable by the decision server. Examples may include a user's history of activity with the value server, transactions the user made on the value server, etc. For example, the value server may indicate to the decision server that certain users are suspicious based on past interactions with the value server and the decision server may use this information to lean towards issuing a challenge, whereas in the value server indicates that a user has behaved normally in the past and is a regular, known user, the decision server may use this information to lean away from issuing a challenge. The decision server can evaluate the user details that the value server provides, along with its own information, and compute a decision. The decision server may also have access to other data about the user or user's device, such as past history from other sources, user properties, a device fingerprint of the user's device, etc. The decision server may determine that the user's device had attempted to automatically solve previous challenges, and therefore decide to issue a challenge that is especially hard to automate. The decision server may decide that no challenge is necessary, that some challenge is necessary, and if necessary, what class, level, and/or type of challenge is warranted. The decision server may store the user properties and details of a present decision, which can be used for making future challenge decisions.

In some embodiments, instead of the value server passing data about the user directly to the decision server, the value server may pass the data via the user device, perhaps in an encrypted form, with the user device forwarding that data to the decision server. If the decision server can decrypt it, but the user device cannot, that allows for secure transmission of that data from the value server to the decision server. Presumably, that would make it difficult for the user device to create a false set of data. In some embodiments where the data passes through the user device, the user device may be directed to pass data back to the decision server if the user device is to obtain access to the value server. In some embodiments, the value server and the decision server may communicate directly. There are various ways the decision server could be alerted to some bypass attempts, in which case the decision server may determine that it is to issue a new challenge, perhaps under the suspicion that the user device has tampered with the data.

The decision server can send a decision message indicating the decision and details to the value server and/or the user device. In the latter case, the decision message may include an identifier that the user device can pass on to the value server. In an embodiment, a value server instructs the user device to make a request to the decision server, the user device makes the request of the decision server, the decision server decides not to issue a challenge and provides the user device with a token that the value server will accept for providing access to the controlled asset, or the decision server decides to issue a challenge and after the user device successfully meets the challenge, a component of the authentication challenge system (the decision server or other component) provides the user device with the token that the value server will accept for providing access to the controlled asset.

A response processor receives challenge details of a challenge and a user response to a challenge and determines whether the challenge is met. In some embodiments, the challenge is deemed met if the user device provides an answer to a challenge query that matches a pre-stored answer to that challenge. The response processor may receive a challenge evaluation data object from another component, where the challenge evaluation data object may include details of the challenge and the user response and reply with a binary answer to whether the response is deemed correct. The reply of the response processor may be to the decision server, which can then store information for future challenges, may be to the user device with a token that the value server would accept, or other options that convey results of a user response evaluation. In some instances, the response processor may provide a reply that is inconsistent with what actually occurred, such as deeming that an automated process is actually a human or that a human authorized user is actually an unauthorized user. However, with a well-designed response processor and other components, such incidents may be infrequent. In some instances, the response processor may initially deem a response to be correct enough to allow for access but may indicate that the user is questionable and that may trigger the decision server to issue additional challenges. This may be useful in the case where a human repetitively attempting access can get the response correct, but still be judged as undesired, and therefore get flagged for more challenges that spend more time in order to render those activities less profitable. In some cases, the response may be correct, but have indicia of automation, such as a response being so quick that it may be from an automated source. In this manner, the decision server can take various factors into account to determine whether to issue a challenge, while the response processor simply outputs a binary decision to allow access or block access. In other variations, the response processor can output a decision that has more than two possibilities. In a specific example, the response processor has three possible responses to a received challenge evaluation data object: "allow the user access to the value server," "deny the user access to the value server," and "issue another challenge."

A challenge server may output and manage challenges, perhaps in the form of challenge data objects. The challenge server may send a challenge data object to a decision server and/or to a user device directly. A challenge data object may have elements that are known to the authentication challenge system but are not conveyed to the user device, such as details used to construct the challenge represented in the challenge data object that may be stored as a set of predetermined human expectations generated based on a model used to construct the challenge.

A challenge processor, perhaps part of the decision server and/or the response processor, can evaluate details, metadata, etc. of a user response, and assess future risks of interactions with that user, which can then be forwarded to the decision server to help with future decisions about whether to challenge the user.

An authentication access system may be used to control access to the value server, such as in cases where the value server is not configured to request and evaluate tokens from users or user interactions. In such cases, the authentication access system can handle those tasks and interact with the decision server, the response processor, and/or the challenge processor. In a specific implementation, user devices and user computer systems of those user devices can only access the value server via the authentication access system and the value server allows for access from any system that the authentication access system allows through. The authentication access system can then be the gatekeeper of the value server.

Figure 7:
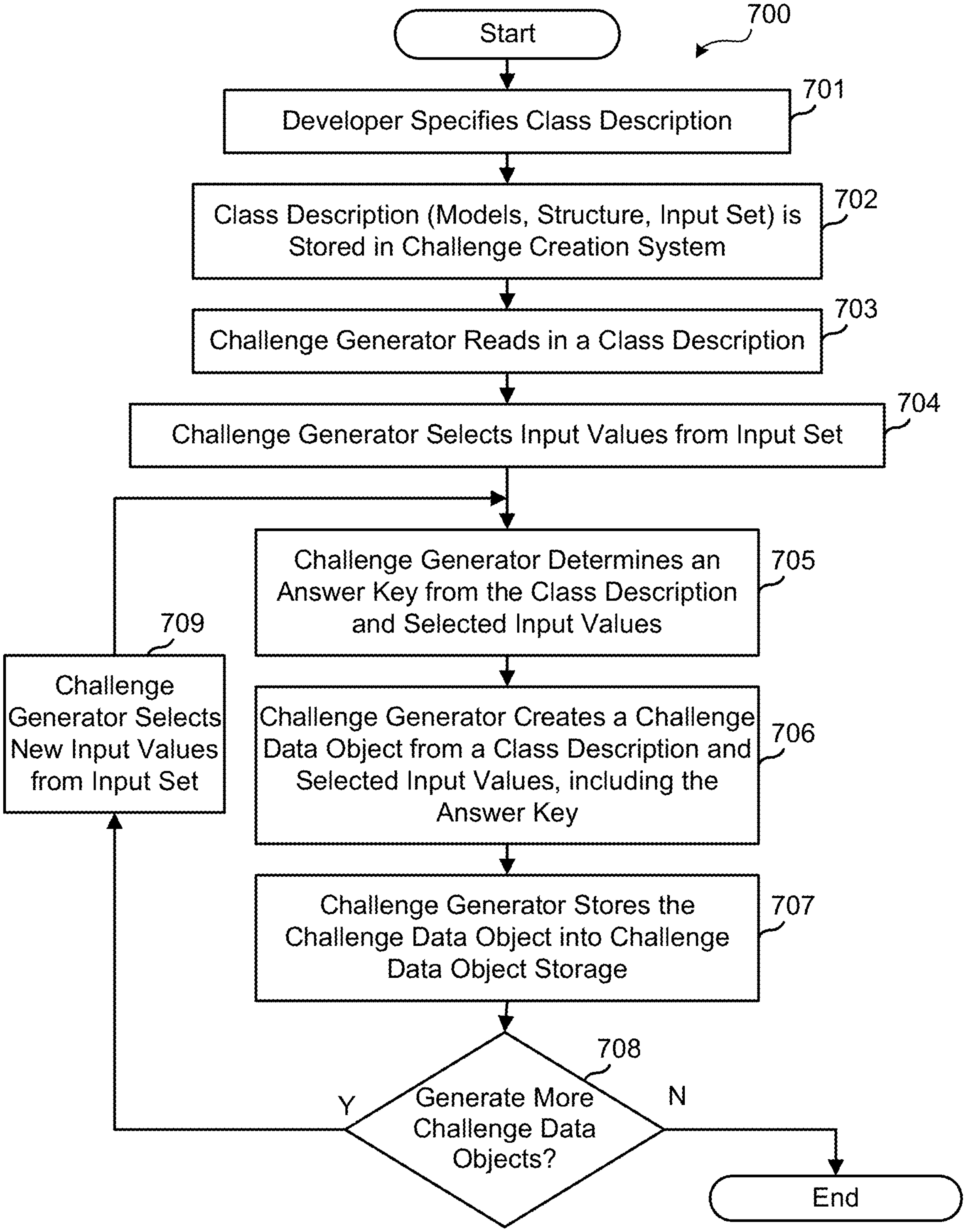
FIG. 7 is a flowchart depicting a method for creation of a class of authentication challenges, according to an embodiment of the present disclosure.

FIG. 7 is a flow diagram of a method 700 for creating a class of authentication challenges, in accordance with one or more aspects of the disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by a computing device (e.g., the challenge creation system 450 of at least FIGS. 4 and 6).

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Referring to FIG. 7, in method 700, at operation 701, a developer may specify a class description. At operation 702, a class description (models, structure, input set) is stored in a challenge creation system. At operation 703, a challenge generator reads in a class description, and at operation 704, the challenge generator selects input values from the input set. At operation 705, the challenge generator determines a challenge image and/or an answer key from the class description and the selected input values. In some embodiments, the challenge image is displayed to the user when the challenge is deployed. In some embodiments, the answer key may be one or more images that match the generated challenge. In some embodiments, the answer key may be a mask as described further below in relation to FIG. 10. In some embodiments, the challenge image and/or the answer key may both be generated by a 3D modeling program. At operation 706, the challenge generator creates a challenge data object from the class description and selected input values, including the challenge image and the answer key. At operation 707, the challenge generator stores the challenge data object into a challenge data object storage. At operation 708, the challenge generator determines whether to generate more CDOs. If so, at operation 709, the challenge generator selects new input values from an input set and loops back to operation 705. If not, the process terminates or proceeds to another class description.

In a particular embodiment, models correspond to images of objects, and the overall challenge image that forms part of the presentation is a combination of these images. In some embodiments, the boundaries of the tiles are clear (e.g., ten distinct images are illustrated) but in other challenges, the images corresponding to different answer options are not presented as clearly delineated tiles to the user devices, but may be a singular scene built of multiple objects where the boundaries are known only to the authentication server. Thus, in some embodiments, the CDO data that the user device receives may not have a clear indication of boundaries and that may be left to the user to discern, as needed, making automated processing harder.

An authentication challenge, according to an embodiment, may proceed as described herein using the generated CDOs. A challenge may involve a user interacting with a two-dimensional (2D) rendering and/or a two-dimensional (2D) rendering of a three-dimensional (3D) virtual object with properties that match a challenge request. For example, the challenge request may present a challenge and/or instruction to the user that instructs the user to select from the rendered 2D images based in some way on the configuration of the displayed objects. As an example, the challenge may request the user to select one or more images based on an ordering of the objects (e.g., "select the third object from the top") and or images that match a particular condition. Various examples of authentication challenge are described further below. These scenarios are merely examples, and the embodiments of the present disclosure are not limited to such examples. Many different types of examples are possible without deviating from the scope of the present disclosure.

Figure 8A:
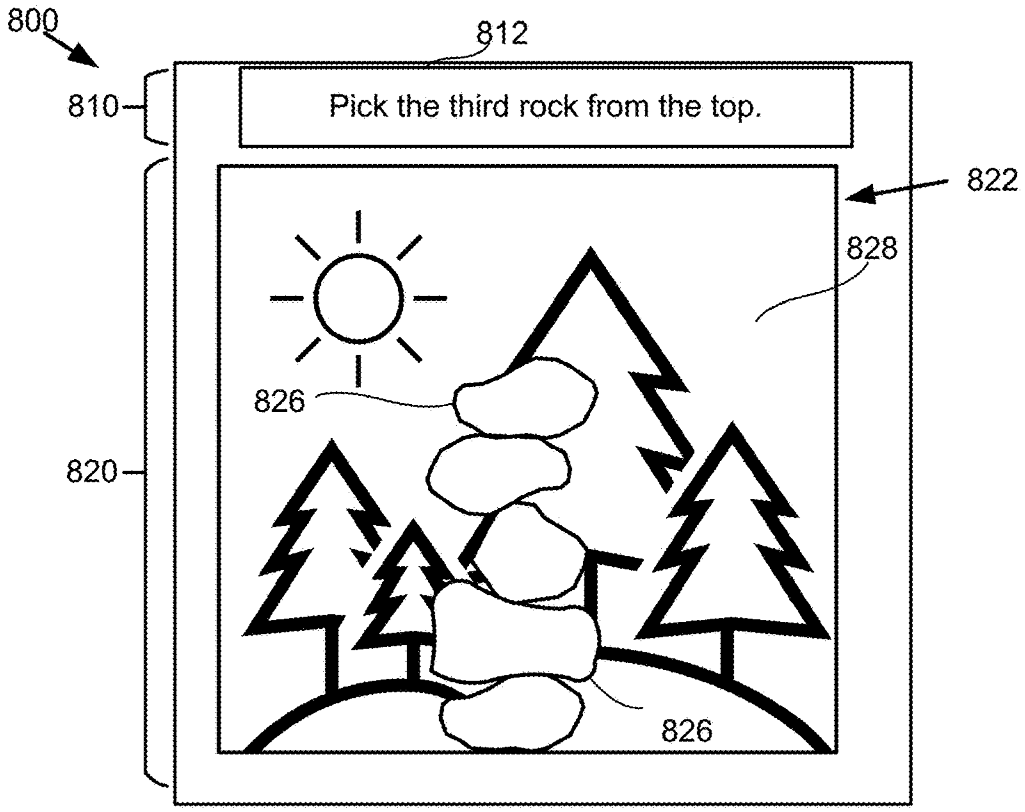
FIG. 8A illustrates and example of a challenge user interface according to some embodiments of the present disclosure.
Figure 8B:
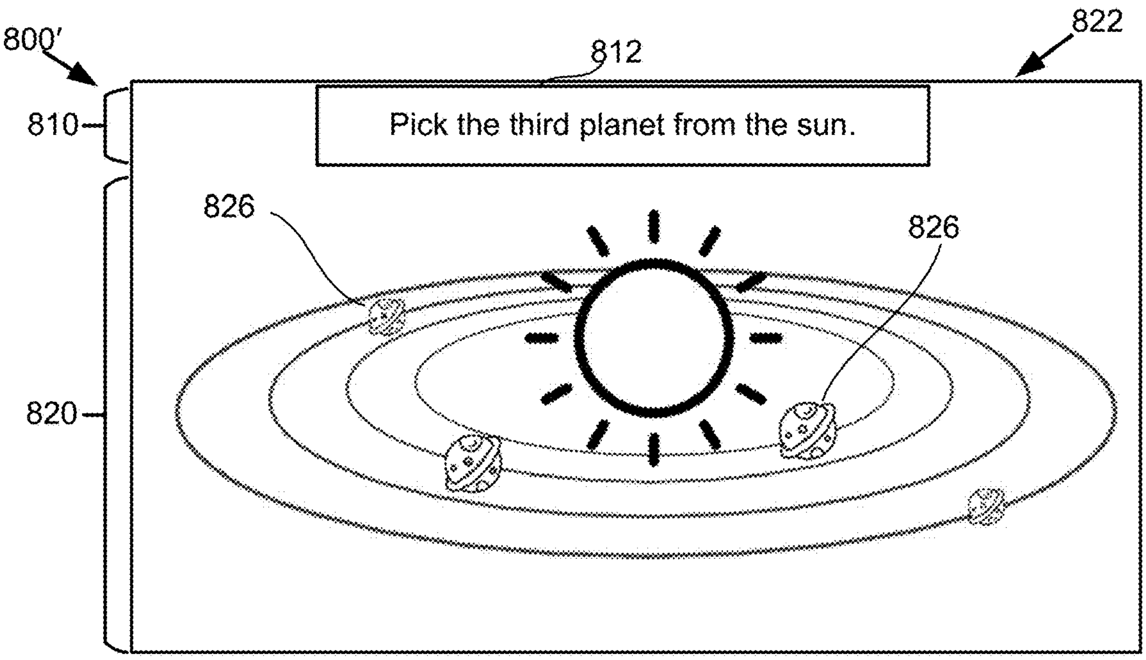
FIG. 8B illustrates another example of a challenge user interface according to some embodiments of the present disclosure.
Figure 8C:
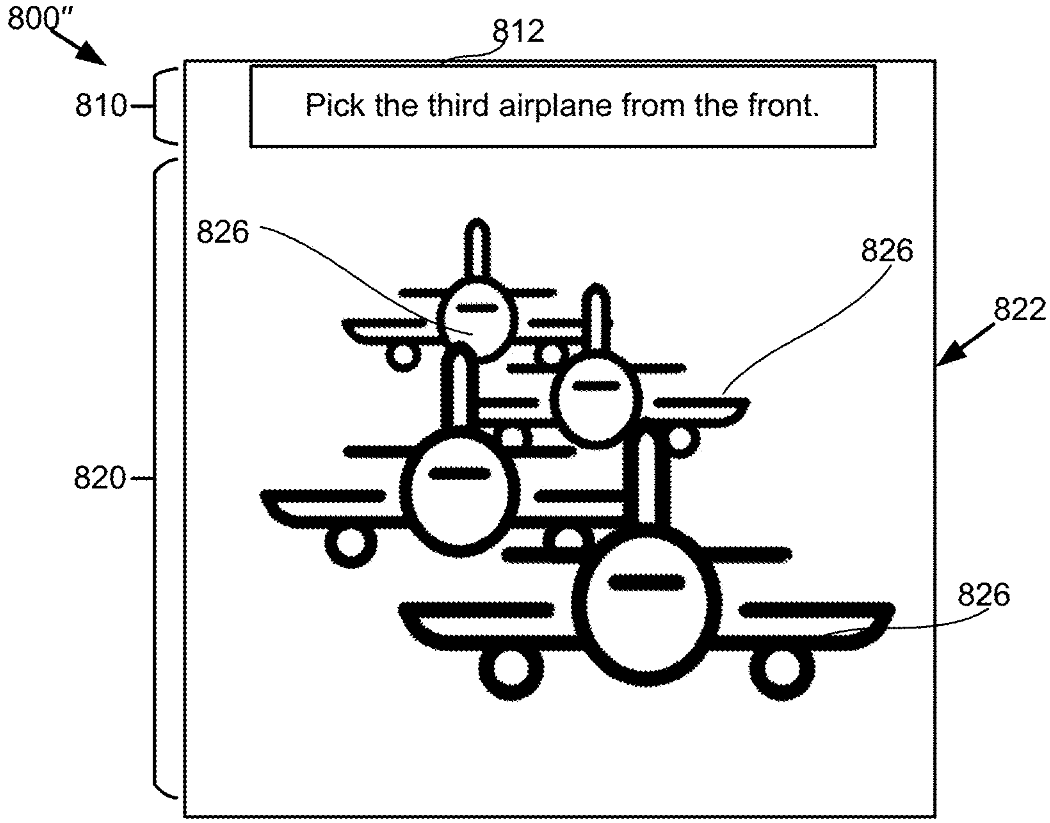
FIG. 8C illustrates another example of a challenge user interface according to some embodiments of the present disclosure.

FIGS. 8A, 8B, and 8C illustrate examples of a challenge user interface 800 according to some embodiments of the present disclosure. Referring to FIG. 8A, the challenge user interface 800 may include a challenge request area 810 and a challenge response area 820.

The challenge request area 810 may include a challenge text 812. In some embodiments, the challenge text 812 may render the challenge and/or instruction in a readable form. For example, the challenge text 812 may provide an explanation of a task to be performed or a question to be answered utilizing the challenge response area 820. In some embodiments, the challenge text 812 may provide or explain a challenge to be solved as part of interacting with the challenge user interface 800.

The challenge response area 820 may contain a challenge image 822 that contains sub-images 826, where some or all of the sub-images 826 are images of one or more objects (e.g., rocks) referred to in the challenge text 812. The one or more sub-images 826 may render or display a particular scene in which the objects are arranged with a particular spatial relationship. For example, the objects may be arranged from top to bottom, left to right, or front to back. The objects may be arranged in a manner that will allow a human to easily detect the ordering of the objects but may be difficult for an automated image classification system.

The challenge text 812 may request the user to select a particular object based on the spatial relationship of the object relative to other objects in the scene. For example, the challenge text 812 shown in FIG. 8A instructs the user to select the third rock (e.g., sub-image 826) from the top of the arrangement of rocks. However, any of the possible spatial relationships may be referenced in formulating the challenge text. For example, the challenge text 812 may instruct the user to select the topmost rock, the second rock from the bottom, etc. The challenge text 812 may be formatted as an image rather than as encoded text characters. In some embodiments, the challenge text 812 and the challenge image 822 may be included in the same image file.

The sub-images 826 depicted may be a variety of different types of objects. For example, instead of a stack of rocks, as shown in FIG. 8A, one of the sub-images 826 may be an image of a ball or an orange. Providing a mix of different types of objects may increase the complexity of the challenge for an automated image classification system, without making the challenge more difficult for human users. When including different types of objects in the scene, the objects may be configured to have similar qualities, for example, a similar shape, a similar color, a similar surface texture, etc.

As shown in FIG. 8A, the challenge response area 820 may also include a background image 828. The background image 828 may make the overall scene more complex, which may make the scene more difficult and time consuming the process for an automated image classification system. Additionally, the background image 828 can, in some examples, also include features that may be similar to the sub-images 826, further increasing the probability that an automated image classification system will misidentify the relevant objects.

The object sub-images 826 may be configured to be selectable in some manner by the user. However, in some embodiments, the challenge object sent to the user may not include any information about the objects sub-images 826 or whether any portion of the challenge response area 820 is selectable. For example, the challenge response area 820 may contain a single pixel bitmap that includes all of the sub-images 826 of the objects, without identifying the borders of objects or boundaries between objects. The user selection may be characterized as X and Y coordinates within the scene. The X and Y coordinates (e.g., within the challenge image 822) may be sent to the challenge server, which may determine whether the provided coordinates correspond with the correct object sub-image 826.

One or more visual cues may be present within the scene to indicate the spatial relationship of the depicted objects of the sub-images 826. The visual cues may be related to the relative placement of sub-images 826 within the challenge image 822, the presence of overlap between object sub-images 826, shadows cast by the objects, the sizes of the objects, the orientation of the objects, and others.

Visual cues that indicate spatial relationships may also be related to the background image 828. For example, the background image 828 may depict a scene with depth such that object placement within the scene serves as a visual cue about the depth order of the objects. For example, the background image 828 may depict a path or a roadway, and the placement of object sub-images 826 relative to the path or roadway can be used to indicate a front-to-back ordering of the objects.

Additional examples of challenge user interfaces based on identifying object configuration are shown in FIGS. 8B and 8C. It will be appreciated that these are merely examples, and that one of ordinary skill in the art will recognize that other types of challenge user interfaces based on identifying object configuration are possible without deviating from the scope of the present disclosure.

FIG. 8B illustrates another example of a challenge user interface 800' according to some embodiments of the present disclosure. The challenge user interface 800' shown in FIG. 8B may include a challenge request area 810 and a challenge text 812 requesting the user select an object from the image 822 shown in the challenge response area 820, as in FIG. 8A. Additionally, the challenge response area 820 may contain a scene with a number of object sub-images 826. However, in the embodiment of FIG. 8B, the challenge is based on identifying an ordering of the object sub-images 826 that is based on a relative distance between the object sub-images 826. In this specific example, the challenge is to pick a planet that is the third planet from the sun. Additionally, orbits are depicted for each planet, making it easier for a human to determine the relative distances of the planetary orbits. In the example of FIG. 8B, the user may need to solve the challenge based on an understanding of the orbits, which may be indicated in the image, as illustrated in FIG. 8B, though embodiments of the present disclosure are not limited to such a configuration.

The example shown in FIG. 8B is just one example of a challenge user interface 800' based on identifying a relative distance between the object sub-images 826. For example, in another example challenge user interface 800', the objects sub-images 826 may be images of ordinary household items depicted on a table, and the challenge request could ask the user to pick the object based on the relative distance of the object from the center of the table, the edge of the table, or some other object on the table. Various other examples embodiments are also possible.

FIG. 8C illustrates another example of a challenge user interface 800" according to some embodiments of the present disclosure. The challenge user interface shown in FIG. 8C may include a challenge request area 810 and a challenge text 812 requesting the user to select a particular object from the image 822 shown in the challenge response area 820, as in FIGS. 8A and 8B.

Additionally, the challenge response area 820 may contain a scene with a number of object sub-images 826. However, in this embodiment, the challenge is based on identifying a depth ordering of the objects. In this specific example, the challenge is to pick an airplane that is the third airplane from the front. The user may determine the configuration of the object sub-images 826 based on visual cues such as the relative sizes of the sub-images 826 of the objects, overlapping between the object sub-images 826, the relationship to background scenery, if present, and others.

The example shown in FIG. 8C is just one example of a challenge user interface 800" based on identifying a depth ordering between the object sub-images 826. For example, in another example challenge user interface 800", the object sub-images 826 may be images of automobiles on a road, people in a room, etc. Various other examples embodiments are also possible.

Figure 9:
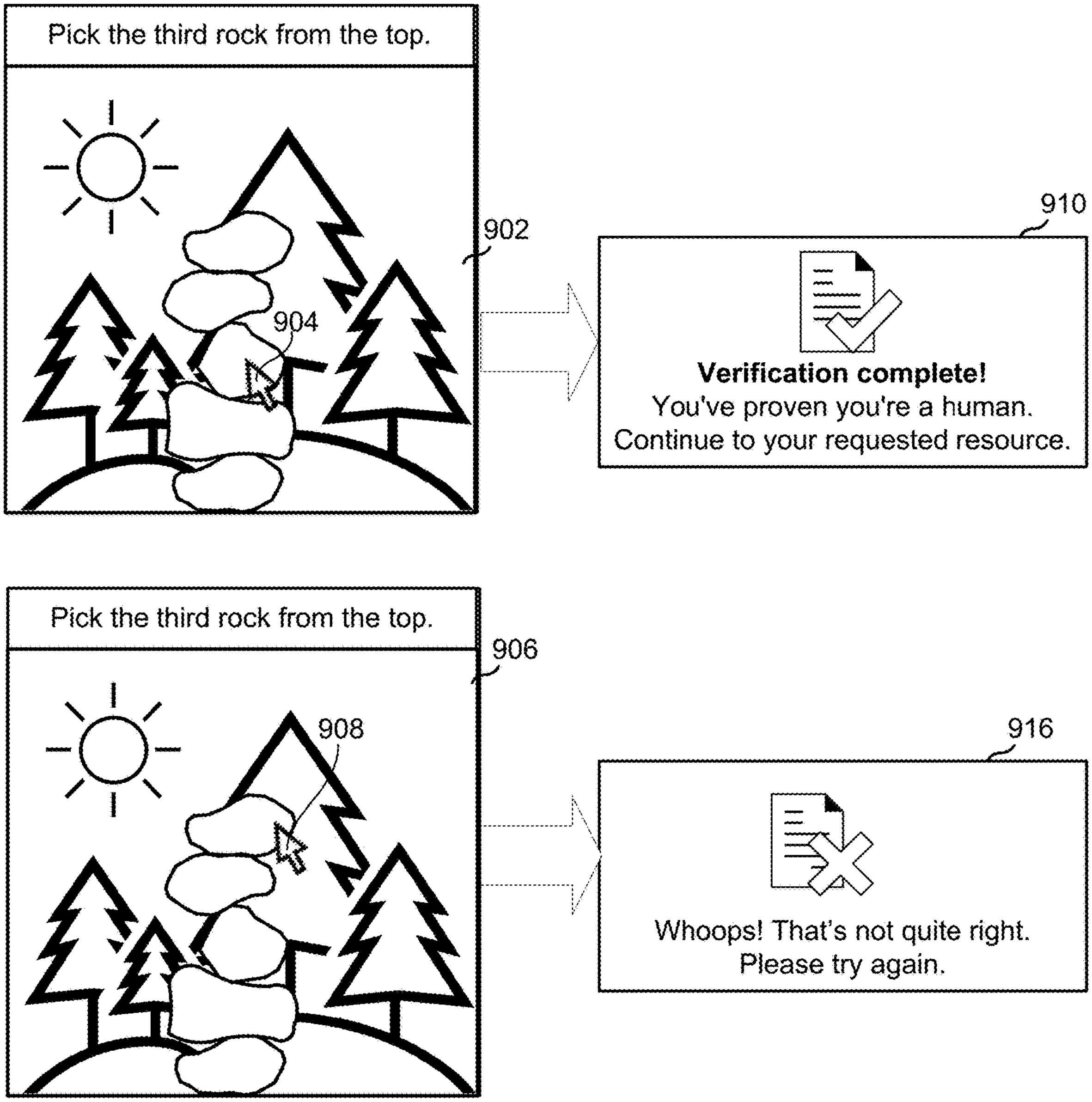
FIG. 9 depicts an example of an operation of checking user responses, according to some embodiments of the present disclosure.

FIG. 9 depicts an example of an operation of checking user responses, according to some embodiments of the present disclosure. A challenge creation system may be used to create challenges that are to be presented to users. The challenge creation system may include a 3D modelling system that performs tasks that enable a challenge creator to create, manipulate, and render virtual objects in creating the challenges. A challenge may be stored electronically as a data object having structure, such as program code, images, parameters for their use, etc. The challenge server may be provided a set of these data structures and serve them up as requested.

In the illustration of FIG. 9, a challenge presentation may be in the form of challenge image 902, in which the user is requested to click on the third rock from the top within a rock sculpture. If the user selects the third rock from the top, as indicated by the pointer 904, a response to that selection may be the success message 910. On the other hand, if the user is presented with a challenge presentation in the form of challenge image 906, and the user points to and selects a different portion of the image as shown by the pointer 908, the user may receive a fail message 916 and, in some embodiments, may be allowed to try again.

In some embodiments, the challenge creation system can create a large number of different challenges from small variations. For example, the same sub-images 826 and background image 822 can be used for several challenges, which may change only in regard to the challenge text 812. In some examples, the sub-images 826 may be recombined and manipulated in different ways (rotation, tilting, etc.) to generate a wider variety of challenges. By being able to create a large number of distinct challenges from a single class, the ratio of effort by challenge creators and users can be kept low. Ideally, the variations of the challenges are not such that a computer process can easily process any one of those to guess the correct human expectation of the challenge.

A challenge creator, such as a 3D artist, puzzle maker, or other challenge creator, may use a modelling program to create one or more virtual objects and give each one various visual properties, for example shape, texture, and others. The challenge creator can then use the modelling program to create a virtual scene in which various virtual objects can be placed and manipulated.

The challenge creator can use the modelling program to create a virtual camera that surveys the virtual scene. The camera may be in an arbitrary position and aimed in an arbitrary direction, within constraints specified by the challenge creator. The challenge creator can use the modelling program to create virtual lights that light up the virtual scene and the virtual objects within it, producing shades of color and texture, shadows, highlights, and reflections. The lights may be in arbitrary positions and aimed in an arbitrary direction, perhaps within constraints specified by the challenge creator.

The challenge creator can direct the modelling program to render a series of images (2D or otherwise) that are captured by the virtual camera, showing the virtual objects in the virtual scene lit by the virtual lights. Each object image may be associated with a list of properties that indicate the sizes of each object, there placement within the image, and the spatial relationship between the object and the other objects. For example, the objects may be numbered in the order of their placement within the image.

A challenge may comprise a presentation (what is to be shown to the user), a model from which the presentation is generated, input parameters for varying what is generated from the model, a criterion related to the presentation, and what would constitute a correct response. The challenge creation routine may generate a challenge based on a model and random or arbitrary input parameters selected from a range of possible input values. The input parameters may be selected from a set of possible input values specified by the challenge creator. For example, the possible input values may include a range describing a possible number of objects to be included in the overall image, a scale range describing a scaling factor to be applied to each object, and one or more orientation ranges describing rotational changes to the virtual objects. The overall image can be automatically generated by the challenge generator by randomly selecting a set of objects from the set of virtual objects, randomly modifying the virtual objects according to input parameters randomly selected from the range of possible input values, and inserting the modified virtual objects into the overall scene.

A criterion may comprise a prompt or a question, whether explicit or implicit, that is provided to the user along with the presentation and to which the user is expected to respond to. In some embodiments, the criterion may be incorporated into the overall image as the challenge text 812 described above in relation to FIGS. 8A-8C. Including the criterion into the image text further complicates the challenge for automated image processors, due to the added processing load of detecting text and applying a semantic meaning to the text.

The object image properties may enable the challenge generator to determine what user input would constitute a correct response based on the criterion. The known correct response, or range of acceptable responses, may be stored in a data element referred to as an answer key. The answer key typically is not available to the user device in a computer processable form. The object image properties may be used to automatically generate an answer key that can be used to determine whether the user provided a correct response. In some embodiments, the answer key may be an image referred to herein as a mask which identifies the pixels correlated with the correct answer. For example, the correct pixels may be black while the remaining pixels may be white. In this way, the pixel coordinates selected by the user can be compared to the mask, and the pixel color at that coordinate indicates whether the user's response was correct. An answered challenge may be represented by a data structure that comprises the user response in the form of pixel coordinates.

With reference to FIGS. 6 and 7, the mask may be automatically generated by the challenge generator 658 based on the criterion, and the property of the object that indicates its order. For example, if the criterion indicates that the user is to select the third rock from the top, and the rocks are numbered in increasing order from top to bottom, the challenge generator may select the rock with order property "3" as the object image from which to generate the mask. In some embodiments, a same mask may be utilized for different criteria. For example, the same mask may be used if the criterion indicates that the user is to select the third rock from the bottom. The challenge image and mask may be stored together as part of the challenge data object. Several such challenge data objects may be saved to storage and accessed by the challenge server when a user attempts to access a protected resource.

Figure 10:
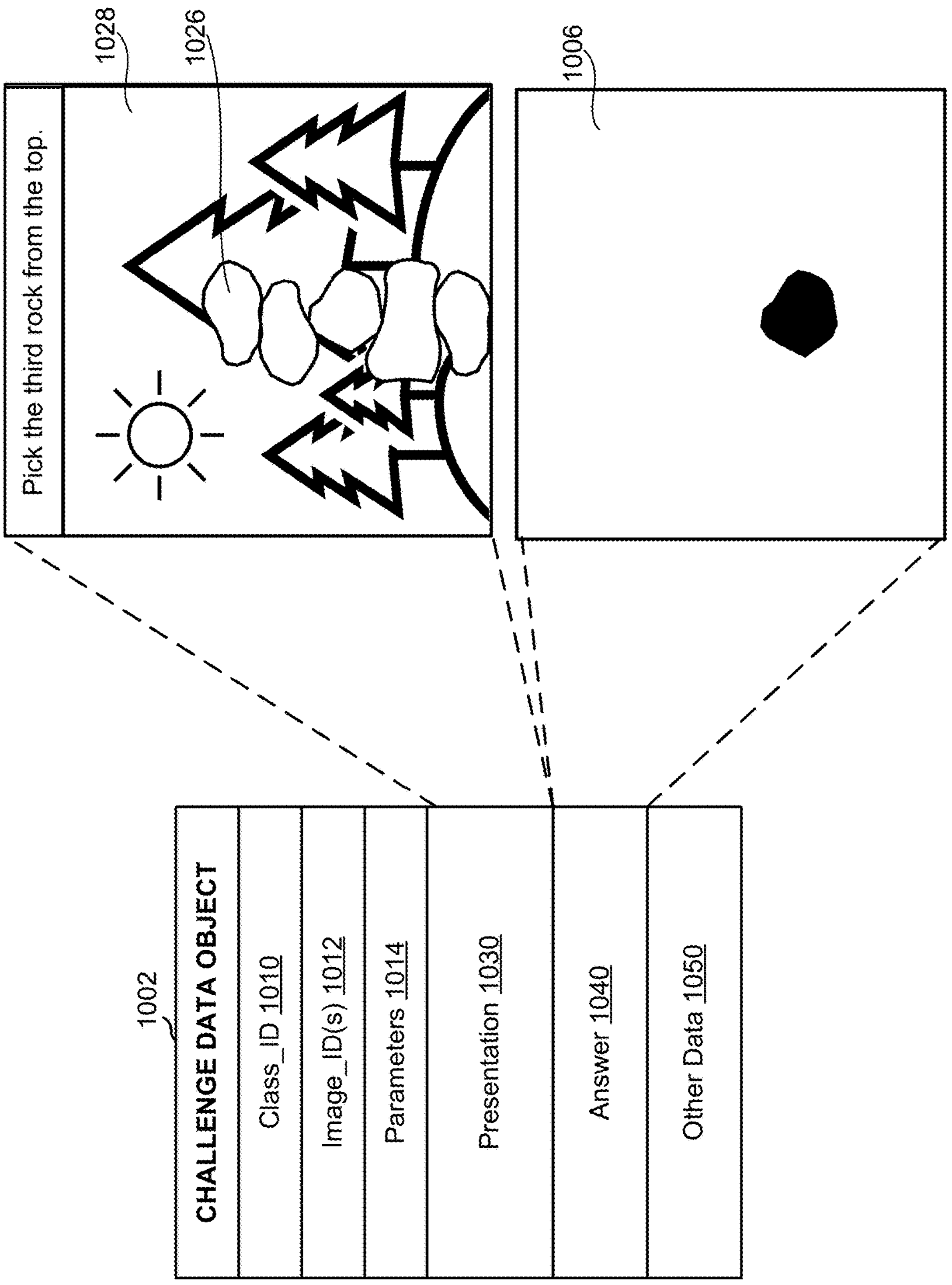
FIG. 10 illustrates an example of a challenge data object, showing an image that may be presented to a user device, data fields indicating criteria to be applied to the image, and other data, according to some embodiments of the present disclosure.

FIG. 10 illustrates an example of a challenge data object 1002, showing an image that may be presented to a user device, data fields indicating criteria to be applied to the image, and other data, according to some embodiments of the present disclosure. In some embodiments, the criterion is in the form of a question. The components of the challenge data object 1002 illustrated in FIG. 10 are merely an example, and, in some embodiments, fewer, more, or different components may be present without deviating from the embodiments of the present disclosure. The challenge data object 1002 may be similar to the CDO 222, 322, and 522 described herein.

In some embodiments, the challenge data object 1002 is generated by a computer from a source, such as a 3D model or other data, and lacks or obscures source data, as can happen when a 3D virtual scene is represented only by an image of the virtual scene, and that source data that is lacking or obscured data is of the nature that it could be expected that an authorized human user would be able to fill in that lacking or obscured data, at least more easily than an unauthorized human user or an unauthorized bot.

The challenge data object 1002 may include a class ID 1010 that describes the type of challenge and how the challenge is to be processed. For example, the class ID 1010 may indicate that the nature of the challenge is to select a first object based on a relative spatial positioning between the first object and the other objects of the displayed challenge, as described herein with respect to FIGS. 8A to 8C.

The challenge data object 1002 may also include one or more image ID(s) 1012 that specifies one or more images included in the challenge presentation. For example, the one or more image ID(s) 1012 may include a background image 1028 and one or more sub-images 1026 that may be utilized for the challenge.

The challenge data object 1002 may also include a parameters description 1014 that describes aspects of the challenge, such as the positioning of the sub-images 1026. In some embodiments, the parameters describing the challenge are not conveyed to the user device, and the background image 1028 and the sub-images 1026 are combined and sent to the user device after being constructed by the challenge server.

The challenge data object 1002 may also include presentation data 1030 that describes aspects or additional details for how the challenge is presented. In some embodiments, the presentation 1030 may include a criterion in the form of a question. A question may be in the form of a selection ("Pick the third rock from the top."), may be asking about a property of what is depicted in a presentation 1030, may be about the correctness of what is depicted in a presentation, etc. The question of the criterion may, in some embodiments, be utilized to form the challenge text 812 illustrated in FIGS. 8A to 8C.

The challenge data object 1002 can also include an answer key 1040. The answer key 1040 may be a separate data field that describes the user manipulation that will result in a correct solution to the challenge. The answer key 1040 may be based on the parameters describing the image positioning and/or the relative orientation selected for the elements of the images as well as the criterion of the presentation 1030. In some embodiments, the answer key 1040 may include a mask 1006, for example, which may indicate a location of the solution to the challenge among the sub-images 1026. In some embodiments, the parameters 1014 describing the image alterations may be used as the answer key 1040 and a separate answer key field 1040 may be omitted. In some embodiments, the challenge data object 1002 may include other data 1050 that may be used as part of generating the challenge and/or the challenge user interface 800, 800', 800".

The challenge server may assemble the challenge data object 1002. The challenge server may send to the user device the challenge, or part thereof, omitting the answer key 1040 and possibly other elements such as the image alteration parameters 1014. Upon receipt, the user device may be configured to display to the user the criterion and the image of the challenge. A user may operate an interface of the user device to choose which one or more images satisfy the criterion by selecting a point within the image. The user device can then send XY coordinates to the challenge server representing the point in the image selected by the user. The challenge server can compare the coordinates of the point chosen by the user to the answer key 1040, e.g., the mask 1006. For example, the challenge server may determine a color, or other value, associated with a pixel within the mask 1006 that is located at the user-selected coordinates.

The challenge server can determine whether the user should receive the service of value (such as access to computer resources) from the value server, and whether the user should complete a new challenge. The determination may be based on whether the user chose an object that satisfied the criterion. The challenge server can again determine whether the user should receive the value from the value server, and whether the user must complete a new challenge. If the challenge server determines that the user must complete a new challenge, the above process can be repeated. If the challenge server determines that the user should receive the value from the value server, the challenge server can send a directive to the user device that the user device request from the value server the service of value. The challenge server can store information about the challenge, the user, and the determination whether the challenge was successfully completed or not.

The user device can send to the value server a set of validation data describing the challenge and a request that the value server issue the service of value to the user device. The value server sends to the challenge server the validation data. The challenge server compares the validation data to information stored about the challenge and the user, and as a result determines whether the validation data is authentic. If the validation data is authentic, the challenge server replies to the value server that the validation data is authentic. The value server can then decide to issue the service of value to the user device. If so decided, the user receives the service of value.

In FIGS. 8A to 8C, challenge user interfaces 800, 800', 800" were illustrated in which a first object is selected from a plurality of objects displayed within the challenge interface 800, 800', 800" based on a relative spatial positioning between the first object and the other objects of the plurality of objects. However, embodiments of the present disclosure are not limited to such a configuration. In some embodiments, one or more objects may be selected and/or ordered based on relative physical properties that may be understood by a human about the characteristics of the objects. For example, in some embodiments, one or more objects may be illustrated that represent objects in the real world that have known physical characteristics, such as size, weight, temperature, and the like, and a user may manipulate a challenge user interface based on these characteristics.

Figure 11A:
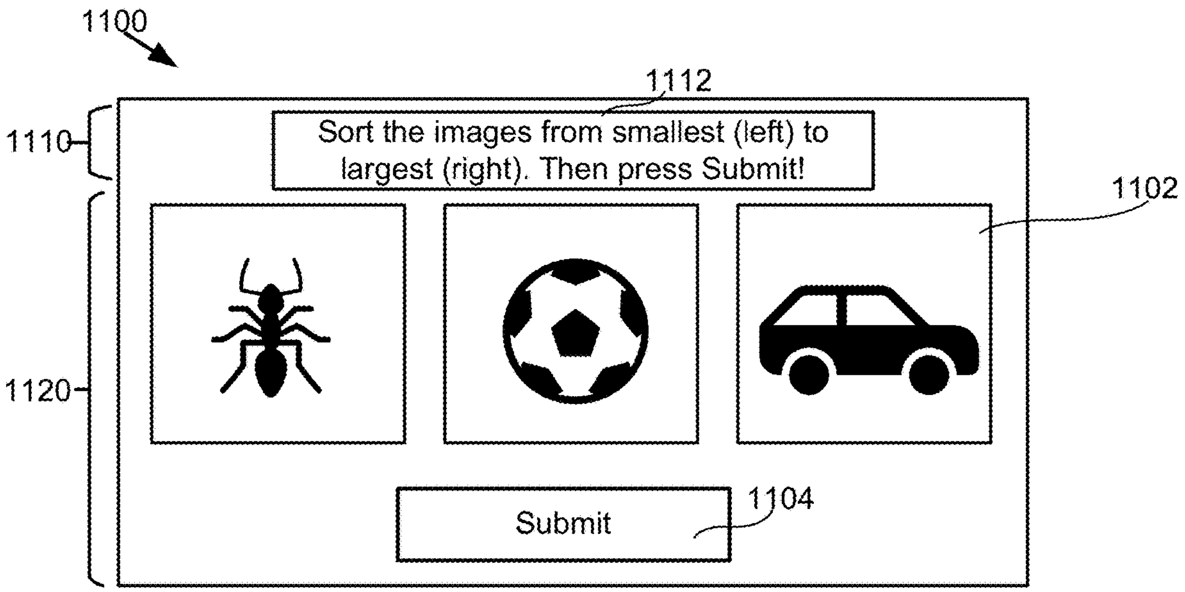
FIG. 11A illustrates an example of the challenge user interface in which a plurality of images are manipulated based on physical characteristics of the objects represented by the images, in accordance with some embodiments of the present disclosure.

FIGS. 11A, 11B, 11C, 11D, and 11E illustrate examples of a challenge user interfaces 1100 according to some embodiments of the present disclosure. A description of elements of FIGS. 11A to 11E that have been previously provided will be omitted for brevity. FIG. 11A illustrates an example of the challenge user interface 1100 in which a plurality of images 1102 are manipulated based on physical characteristics of the objects represented by the images 1102, in accordance with some embodiments of the present disclosure. Referring to FIG. 11A, the challenge user interface 1100 may include a challenge request area 1110 and a challenge response area 1120.

The challenge request area 1110 may include a challenge text 1112. In some embodiments, the challenge text 1112 may render the challenge and/or instruction in a readable form. For example, the challenge text 1112 may provide an explanation of a task to be performed or a question to be answered utilizing the challenge response area 1120. In some embodiments, the challenge text 1112 may provide or explain a challenge to be solved as part of interacting with the challenge user interface 1100.

The challenge response area 1120 may contain two or more images 1102. In the example embodiment shown in FIG. 11A, three images 1102 are shown. However, the challenge response area 1120 can include any suitable number of images 1102, including two, four, five, six, or more. Each image 1102 can be a representation of a particular object that will be recognizable and familiar to most human users. Additionally, a type of the object represented by the image 1102 will have certain basic physical characteristics that will be familiar to most people based on their own real world knowledge. For example, the type of object represented by the image 1102 will convey to the user certain information about the object's size, weight, natural environment, and the like.

The challenge text 1112 may direct the user to arrange the images 1102 in the challenge response area 1120 based on the user's real world knowledge about the types of objects depicted by the images 1102. For example, the embodiment shown in FIG. 11A requests the user to arrange the images 1102 in order from smallest to largest (e.g., in size) based on the objects depicted by the images 1102. Based on the type of object depicted in each image 11022, a human user would be easily able to arrange the images 1102 accordingly. However, an automated image recognition system configured to detect and/or classify a particular problem may have difficulty interpreting the images 1102 to provide the correct response. Not only would the automated image recognition system have to correctly determine the object type, the automated system would also need to be able to associate each object type represented by a respective image 1102 with the relevant characteristics, such as the object's size in this example.

In some embodiments, each image 1102 may be included in its own separate image tile. The user can arrange the images 1102 by clicking and dragging the tiles to a desired location. Once the tiles are arranged to the user's satisfaction, the user can press the submit button 1104 to submit the answer to the challenge server to gain access to the protected service.

In the example shown in FIG. 11A, the objects represented by the images 1102 are a car, a soccer ball, and an ant. However, the challenge response area 1120 may contain any suitable combination of objects that would be recognizable to a human user and have some characteristic that allows the user to differentiate between the images 1102. In this example, the characteristic is size, but other characteristics may be used as well, including weight and others. Additionally, the request may be for any type of ordering, e.g., heaviest to lightest, or lightest to heaviest. The images 1102 may be photorealistic images, images captured by an imaging device (e.g., photographs), stylized images, line drawings, cartoon-like images, computer generated graphics, and others. Additionally, the images 1102 may or may not include background scenery.

Figure 11B:
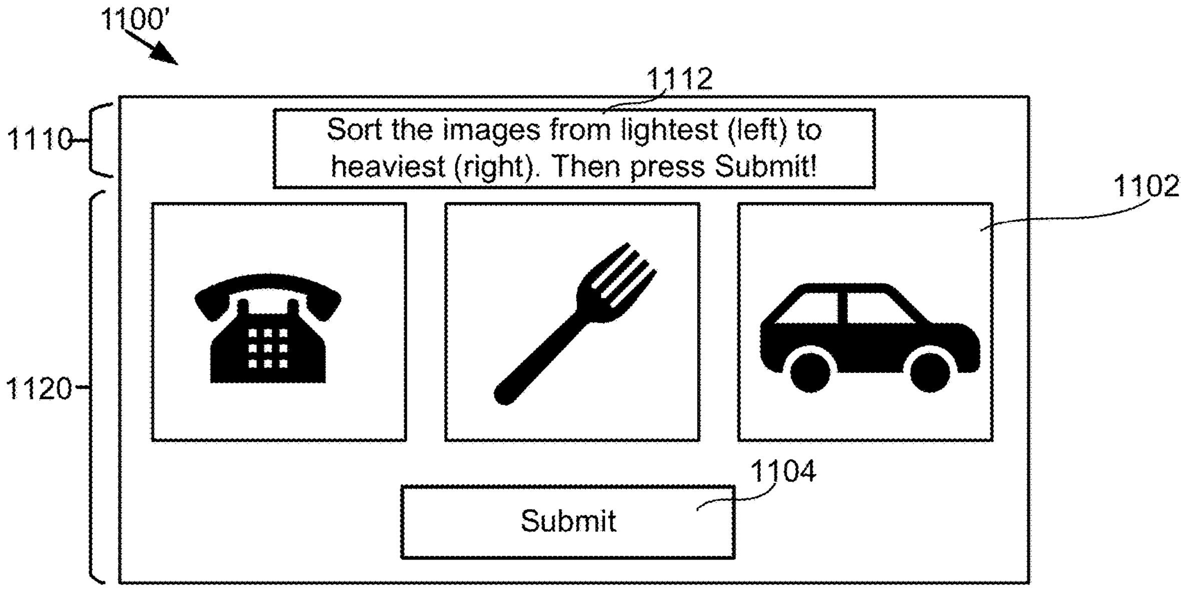
FIG. 11B illustrates another example of a challenge user interface according to some embodiments of the present disclosure.
Figure 11C:
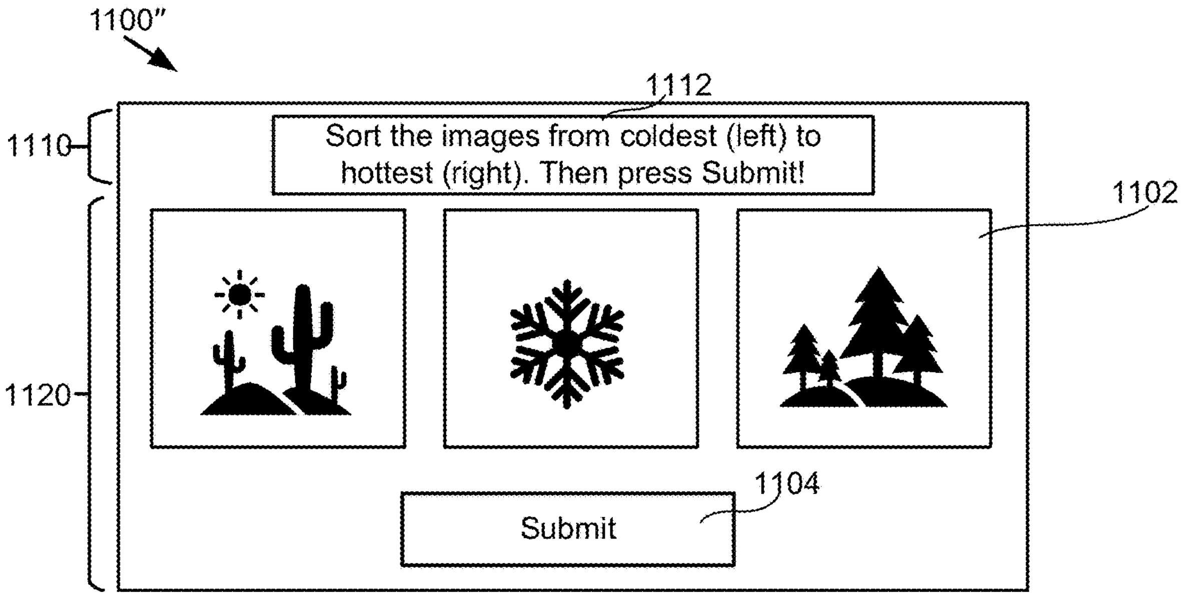
FIG. 11C illustrates another example of a challenge user interface according to some embodiments of the present disclosure.
Figure 11D:
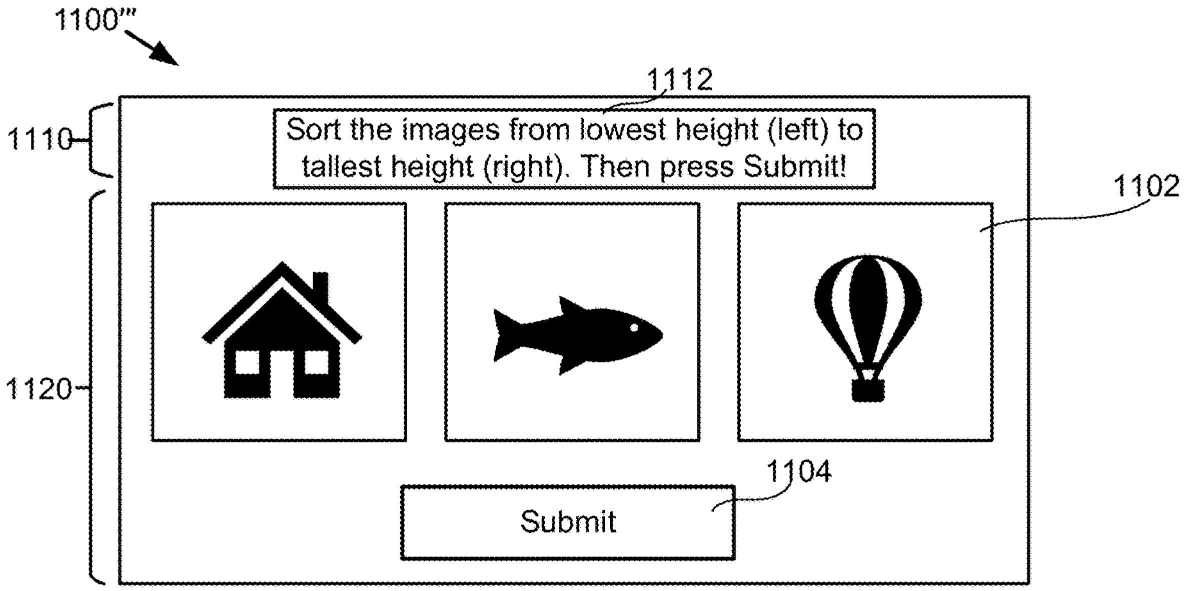
FIG. 11D illustrates another example of a challenge user interface according to some embodiments of the present disclosure.

Additional examples of challenge user interfaces based on world knowledge are shown in FIGS. 11B-D. It will be appreciated that these are merely examples, and that one of ordinary skill in the art will recognize that other types of challenge user interfaces based on identifying object configurations are possible without deviating from the scope of the present disclosure.

FIG. 11B illustrates another example of a challenge user interface 1100' according to some embodiments of the present disclosure. The challenge user interface 1100' shown in FIG. 11B is similar to the challenge user interface 1100 shown in FIG. 11A, and includes a challenge response area 1120 that contains two or more images 1102 and a challenge request area 1110 with challenge text 1112 requesting the user to arrange the images 1102 in the challenge response area 1120 based on the user's real world knowledge about the types of objects depicted by the images 1102. However, in this embodiment, the challenge is based on recognizing a relative weight of the objects depicted by the images 1102, and the challenge text 1112 requests the user to arrange the images in order from lightest to heaviest. In this embodiment, the depicted images 1102 are illustrations of objects as in FIG. 11A. The images 1102 may be computer generated graphics and may be 2D images rendered from 3D virtual objects, though the embodiments of the present disclosure are not limited to such a configuration. In some embodiments, the images 1102 may be photorealistic images.

The images 1102 in FIG. 11B do not include any background scenery. Accordingly, the background does not provide any contextual information about the images 1102 that could otherwise provide visual cues indicating characteristics of the depicted objects. Rather, only enough information is conveyed to enable the user to identify the object type represented by the image 1102. Any additional information about the object represented by the image 1102 is determined from the user's own real world knowledge, not any additional cues that are being provided in the image 1102.

The example shown in FIG. 11B is just one example of a challenge user interface 1100' based on identifying a relative weight of the depicted objects of the images 1102. For example, in FIG. 11B, a telephone, a fork, and a car are illustrated by the images 1102. Despite the images 1102 being roughly the same size, a user will understand that the objects represented by the images typically have different weights. Various other example embodiments are also possible.

FIG. 11C illustrates another example of a challenge user interface 1100" according to some embodiments of the present disclosure. The challenge user interface 1100" shown in FIG. 11C is similar to the challenge user interfaces 1100, 1100' shown in FIGS. 11A and 11B, and includes a challenge response area 1120 that contains two or more images 1102 and a challenge request area 1110 with challenge text 1112 requesting the user to arrange the images in the challenge response area 1120 based on the user's real world knowledge about the types of objects depicted by the images 1102. However, in this embodiment of FIG. 11C, the objects depicted by the images 1102 represent different types of landscapes and/or environments and the challenge is based on recognizing environmental features of the landscapes. In this example, the user is requested to arrange the images according to their temperatures. In FIG. 11C, symbolic images 1102 are used to represent a desert, snow, and a forest. However, other characteristics could also be used, such as aridness (e.g., driest to wettest), altitude (e.g., highest to lowest), latitude (e.g., distance from the equator), and others.

The example shown in FIG. 11C is just one example of a challenge user interface 1100" based on identifying characteristics of a landscape and/or environment. Various other example embodiments are also possible. Additionally, the temperature characteristic may also be useful for differentiating between objects other than landscapes. For example, another challenge user interface 1100" based on temperature may depict an ice cube, a cup of coffee, and a glowing-hot piece of metal, for example.

FIG. 11D illustrates another example of a challenge user interface 1100''' according to some embodiments of the present disclosure. As in previous examples, the challenge user interface 1100''' includes a challenge response area 1120 that contains two or more images 1102 and a challenge request area 1110 with challenge text 1112 requesting the user to arrange the images 1102 in the challenge response area 1120 based on the user's real world knowledge about the types of objects depicted by the images 1102. However, in this embodiment, the challenge is based on recognizing characteristics of the natural environmental in which the object exists. In this example, the user is requested to arrange the images 1102 according to their height and/or altitude. In FIG. 11D, a house, a fish, and a balloon are illustrated.

In some examples, some or all of the images 1102 may include visual cues that indicate the object's height. For example, an object may be depicted in an image 1102 next to another known object for scale. However, in some examples, knowledge of each object's height is not obtained from the image 1102 itself, but rather from knowing characteristics of the objects depicted by the image 1102, specifically, wherein such objects are typically found. For example, rather than showing ocean waves above a fish or land below a house, the images 1102 depict these objects without any background scenery. The example shown in FIG. 11D is just one example of a challenge user interface based on identifying characteristics of an object's natural environment. Various other example embodiments are also possible.

Figure 11E:
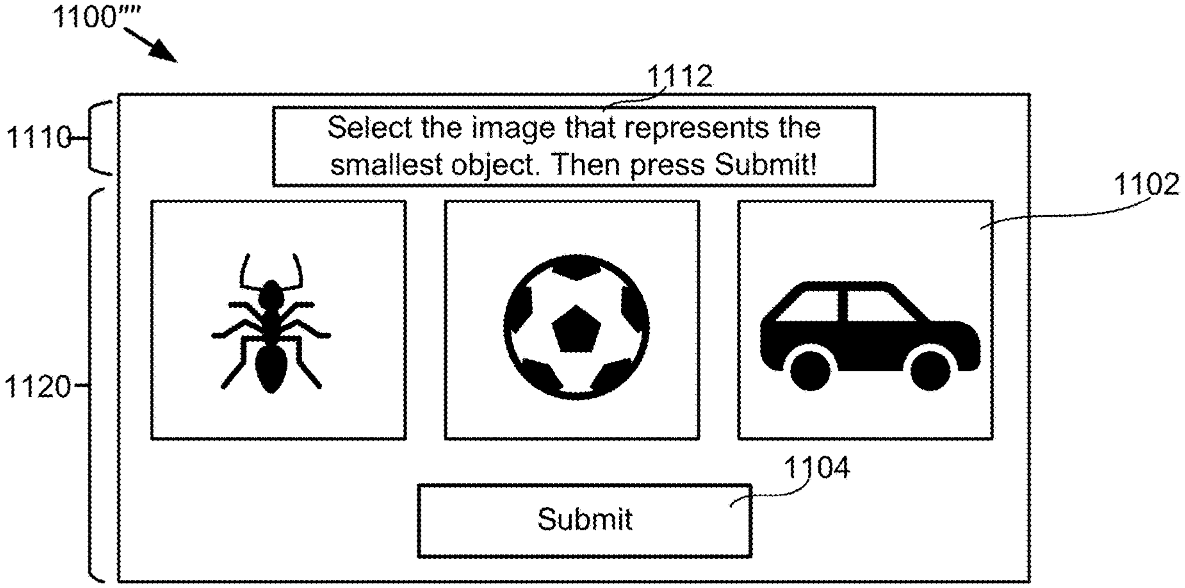
FIG. 11E illustrates another example of a challenge user interface according to some embodiments of the present disclosure.

FIG. 11E illustrates another example of a challenge user interface 1100"" according to some embodiments of the present disclosure. As in previous examples, the challenge user interface 1100" includes a challenge response area 1120 that contains two or more images 1102 and a challenge request area 1110 with challenge text 1112. The example of FIG. 11E is similar to that of FIG. 11A. Namely, the challenge user interface 1100"" presents a number of images 1102 that are intended to differentiate objects represented by the images 1102 by size. However, unlike the embodiment illustrated in FIG. 11A, in the challenge user interface 1100"" the user is requested to select the image 1102 representing the smallest image 1102 rather than ordering the images 1102 by relative size. For example, the user may select the image 1102 representing the smallest object (e.g., the ant), and then select the submit button 1104. In some embodiments, the submit button 1104 may be omitted from the challenge user interface 1100", and the selection of an image 1102 may be treated as a submission of the user input. Though the challenge user interface 1100"" includes a challenge to select the smallest object, a number of variations could be made to the challenge user interface 1100"". For example, the challenge user interface 1100"" could request the user to select an image 1102 corresponding to the largest object, or the middle-sized object. It will be understood that the embodiments of FIGS. 11B to 11D could be similarly modified to select only a single image 1102 rather than ordering the images 1102.

Figure 12:
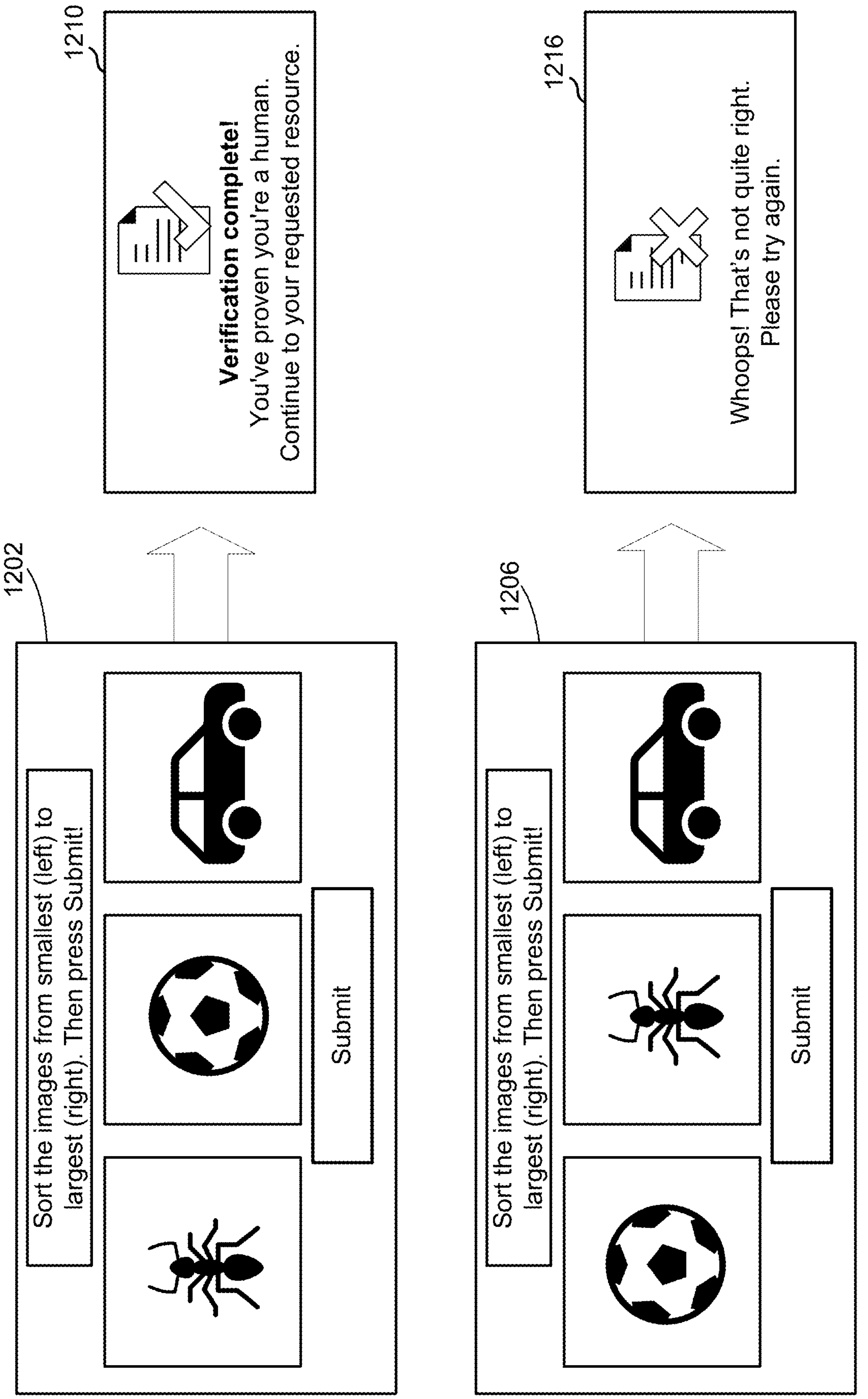
FIG. 12 depicts an example of an operation of checking user responses, according to some embodiments of the present disclosure.

FIG. 12 depicts an example of an operation of checking user responses, according to some embodiments of the present disclosure. The checking of user responses may be similar to that described herein with respect to FIG. 9 and, as a result, a duplicate description of similar elements will be omitted.

In the illustration of FIG. 12, a challenge presentation may be in the form of the challenge images arranged as shown in FIG. 11A. The user is then expected to re-arrange the images from smallest to largest, as shown in challenge response area 1202. A response to that arrangement may be the success message 1210. On the other hand, if the user re-arranges the images in a manner that is not consistent with the challenge text, as shown in challenge response area 1206, the user may receive a fail message 1216 and, in some embodiments, may be allowed to try again.

In some embodiments, the challenge creation system can create a large number of different challenges from small variations. By being able to create a large number of distinct challenges from a single class, the ratio of effort by challenge creators and users can be kept low. Ideally, the variations of the challenges are not such that a computer process can easily process any one of those to guess the correct human expectation of the challenge.

A challenge creator, such as a 3D artist, puzzle maker, or other challenge creator, may generate a variety of images, some or all of which may be generated using a modelling program to create one or more virtual objects. The challenge creator can store these images to a pool of images that a challenge generator can draw from to generate a specific challenge user interface. The challenge creator may also assign physical properties or other characteristics to each of the images based on world knowledge about the object depicted in each image. Each characteristic or property may also be ranked so that the relationship between various objects can be determined automatically by the challenge generator. For example, an image of an elephant may have size, weight, and temperature characteristics that are ranked in accordance with their relative size, weight, and temperature compared to other objects in the pool of images.

A challenge may comprise a presentation (what is to be shown to the user) including the two or more images, a model from which the presentation is generated, possibly input parameters for varying what is generated from the model, a set of characteristics of the depicted objects (not readily determinable from the presentation without the addition of human mental processing), a criterion related to the presentation, and what would constitute a correct response. The input parameters may be selected from a set of possible input values. A criterion may comprise a prompt or a question, whether explicit or implicit, that is provided to the user to indicate how the user is to order the images. In operation, a challenge generator may generate a challenge from a known model for a class of challenges, having a known correct response that corresponds to the known set of human expectations about the model, so that a challenge processor can easily evaluate whether a user's response is consistent with the presentation and the criterion. The known correct response, or range of acceptable responses, may be stored in a data element referred to as an answer key. In some embodiments, the challenge generator can automatically generate the answer key based on the criterion and the object characteristics. For example, if the criterion is to order objects by size from smaller to larger, the answer key can be generated by ordering the images based on the values stored to the corresponding size characteristic provided for each image. The answer key typically is not available to the user device in a computer processable form but may be easily determined by a human with real-world experience. An answered challenge may be represented by a data structure that comprises the elements of the challenge and the user response to the criterion.

A challenge creation routine may generate a challenge based on a random or arbitrary input number selected from an input set and a model that describes parameters of the challenge. For example, the parameters may describe a number of images to be presented, the characteristic on which to base the criterion, and whether the criterion is to place the images in an increasing or decreasing order. The challenge generator may randomly select a set of images, place them in a presentation, and automatically generate the criterion and the answer key based on the object characteristics.

Figure 13:
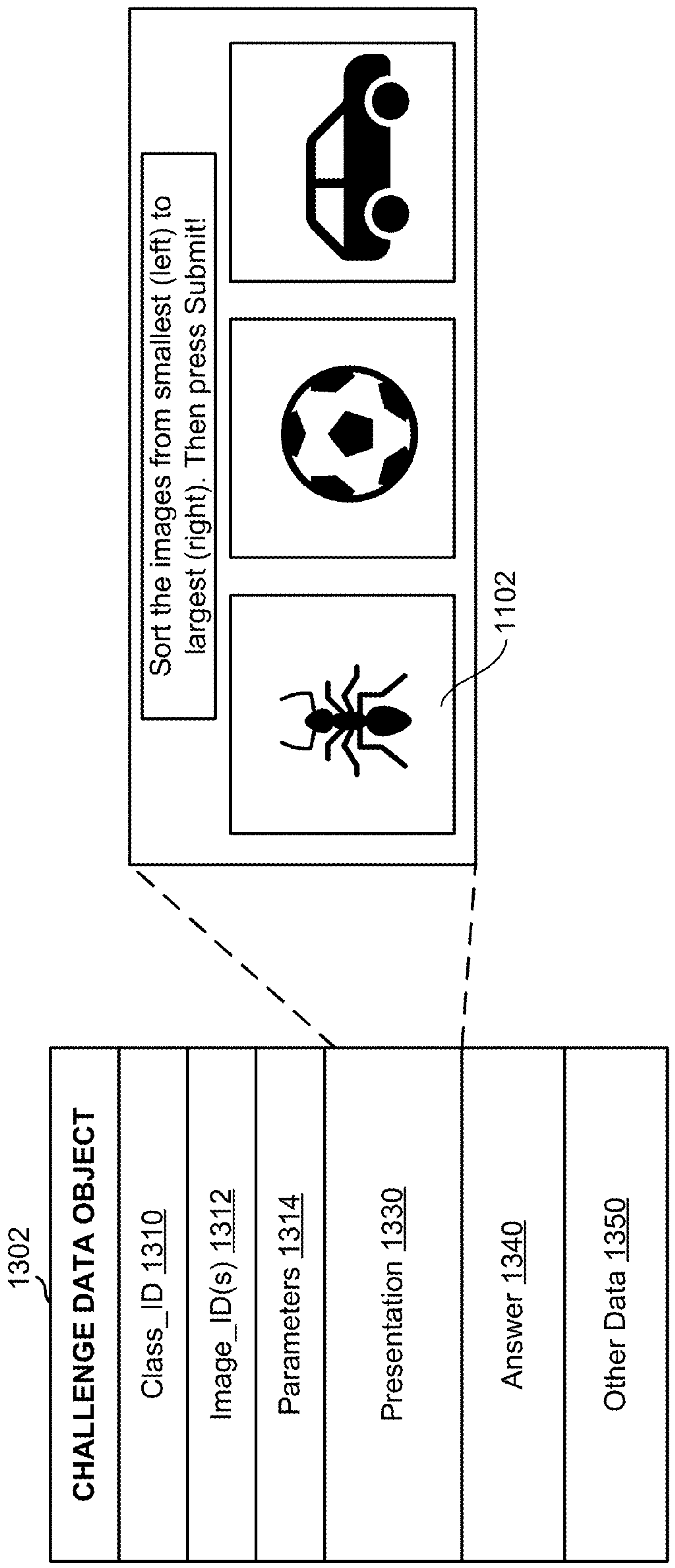
FIG. 13 illustrates an example of a challenge data object, showing an image that may be presented to a user device, data fields indicating criteria to be applied to the image, and other data, according to some embodiments of the present disclosure.

FIG. 13 illustrates an example of a challenge data object 1302, showing an image that may be presented to a user device, data fields indicating criteria to be applied to the image, and other data, according to some embodiments of the present disclosure. The components of the challenge data object 1302 illustrated in FIG. 13 are merely an example, and, in some embodiments, fewer, more, or different components may be present without deviating from the embodiments of the present disclosure. The challenge data object 1302 may be similar to the CDO 222, 322, 522, and 1022 described herein.

In some embodiments, the challenge data object 1302 is generated by a computer from a source, such as a 3D model or other data, and lacks or obscures source data, as can happen when a 3D virtual scene is represented only by an image of the virtual scene, and that source data that is lacking or obscured data is of the nature that it could be expected that an authorized human user would be able to fill in that lacking or obscured data, at least more easily than an unauthorized human user or an unauthorized bot.

The challenge data object 1302 may include a class ID 1310 that describes the type of challenge and how the challenge is to be processed. For example, the class ID 1310 may indicate that the nature of the challenge is to order a series of images and/or select a particular image based on characteristics of the objects displayed in the images, as described herein with respect to FIGS. 11A to 11E.

The challenge data object 1302 may also include one or more image ID(s) 1312 that specifies one or more images included in the challenge presentation. For example, the one or more image ID(s) 1312 may include one or more images 1102 that may be utilized for the challenge. In some embodiments, the challenge server can store each image ID 1312, associated with the list of characteristics of objects in the image.

The challenge data object 1302 may also include parameter data 1314 that describe aspects of the challenge, such as the positioning of the images 1102. In some embodiments, the parameter data 1314 describing the challenge are not conveyed to the user device, and the images 1102 are combined and sent to the user device after being constructed by the challenge server.

The challenge data object 1302 may also include presentation data 1330 that describes aspects or additional details for how the challenge is presented. In some embodiments, the presentation 1330 may include a criterion in the form of a question and/or prompt. The question and/or prompt may be in the form of a selection ("Pick the image associated with the heaviest object."), may be asking about a property of what is depicted in a presentation 1330, may be about the correctness of what is depicted in a presentation, etc. The question of the criterion may, in some embodiments, be utilized to form the challenge text 1112 illustrated in FIGS. 11A to 11E.

The challenge data object 1302 can also include an answer key 1340. The answer key 1340 may be a separate data field that describes the user manipulation that will result in a correct solution to the challenge. The answer key 1340 may be based on the parameters describing the image positioning and/or the relative orientation selected for the elements of the images as well as the criterion of the presentation 1330. The challenge server can store each image ID 1312, associated with the list of characteristics of objects in the image, and the answer key 1340 for the challenge data object 1302, which may indicate the correct ordering of the images 1102. In some embodiments, the challenge data object 1302 may include other data 1350 that may be used as part of generating the challenge and/or the challenge user interface 1100, 1100', 1100", 1100'", 1100"".

The challenge server may assemble the challenge data object 1302. The challenge server may send to the user device the challenge, or part thereof, omitting the answer key 1340 and possibly other elements such as the image alteration parameters 1314. Upon receipt, the user device may be configured to display to the user the criterion and the image of the challenge. A user may operate an interface of the user device, for example, to arrange the images 1102 of the user interface and/or select a particular image 1102. The order of the images 1102 and/or the image 1102 that is selected may be sent to the challenge server as the user response.

The challenge server can determine whether the user should receive the service of value (such as access to computer resources) from the value server, and whether the user should complete a new challenge. The determination may be based on whether the user chose an object that satisfied the criterion. The challenge server can again determine whether the user should receive the value from the value server, and whether the user must complete a new challenge. If the challenge server determines that the user must complete a new challenge, the above process can be repeated. If the challenge server determines that the user should receive the value from the value server, the challenge server can send a directive to the user device that the user device request from the value server the service of value. The challenge server can store information about the challenge, the user, and the determination whether the challenge was successfully completed or not.

The user device can send to the value server a set of validation data describing the challenge and a request that the value server issue the service of value to the user device. The value server sends to the challenge server the validation data. The challenge server compares the validation data to information stored about the challenge and the user, and as a result determines whether the validation data is authentic. If the validation data is authentic, the challenge server replies to the value server that the validation data is authentic. The value server can then decide to issue the service of value to the user device. If so decided, the user receives the service of value.

Figure 14A:
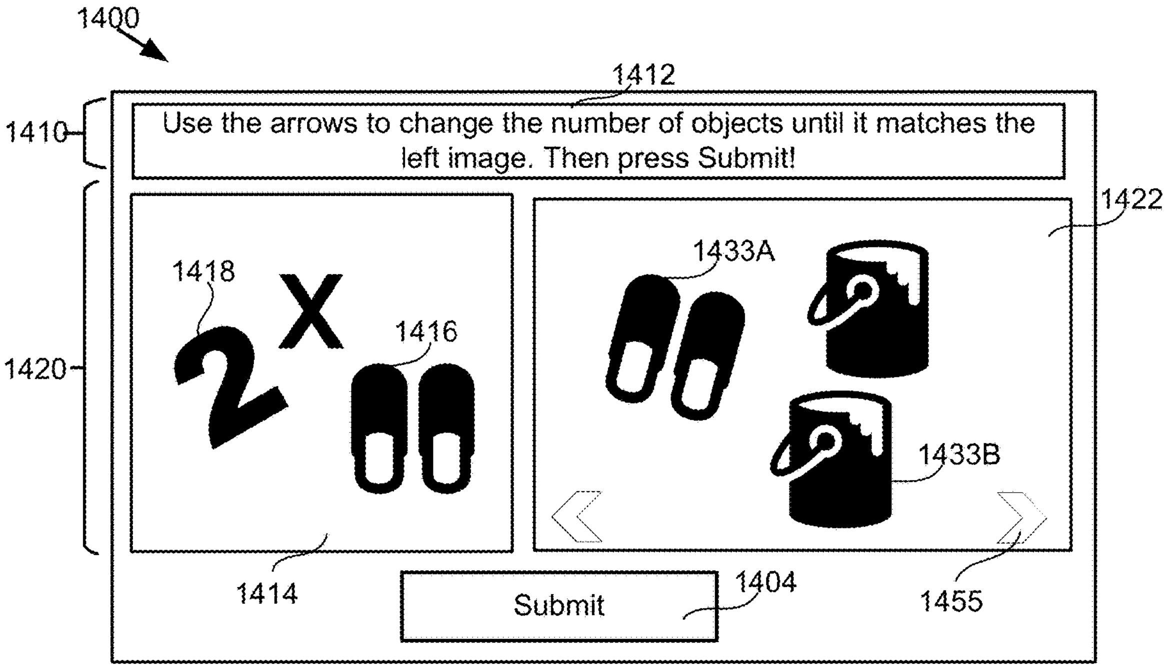
FIG. 14A illustrates an example of the challenge user interface in which combinations of shapes are utilized in an image matching challenge, in accordance with some embodiments of the present disclosure.

FIGS. 14A, 14B, 14C, 14D, and 14E illustrate examples of a challenge user interfaces 1400 according to some embodiments of the present disclosure. A description of elements of FIGS. 14A to 14E that have been previously provided will be omitted for brevity. FIG. 14A illustrates an example of the challenge user interface 1400 in which combinations of shapes are utilized in an image matching challenge, in accordance with some embodiments of the present disclosure. FIG. 14A and the other figures may use like reference numerals to identify like elements. A letter after a reference numeral, such as "1433A," indicates that the text refers specifically to the element having that particular reference numeral. A reference numeral in the text without a following letter, such as "1433," refers to any or all of the elements in the figures bearing that reference numeral. Referring to FIG. 14A, the challenge user interface 1400 may include a challenge request area 1410 and a challenge response area 1420.

The challenge response area 1420 may include a challenge key 1414, an interface for displaying a plurality of images 1422, and a submit button 1404. In some embodiments, the challenge response area 1420 may illustrate a single image 1422 at a time. The user may be able to navigate through a plurality of images 1422 by utilizing an interface operation (e.g., a mouse click, touch, or other type of user interface selection) on an image control interface 1455. Interfacing with the image control interface 1455 may cycle through the plurality of image 1422, one at a time. For example, selecting the portion of the image control interface 1455 depicted as a left arrow may move through the images 1422 in a first direction, while selecting the portion of the image control interface 1455 depicted as a right arrow may move through the images 1422 in a second direction. Though FIG. 14A illustrates the plurality of images 1422 being shown one at a time, the embodiments of the present disclosure are not limited to this configuration. In some embodiments, the images 1422 may be displayed in a grid (e.g., in a manner similar to the embodiments of FIGS. 11A to 11E), and the image control interface 1455 may be omitted.

The challenge request area 1410 may include a challenge text 1412. In some embodiments, the challenge text 1412 may render the challenge and/or instruction in a readable form. For example, the challenge text 1412 may provide an instruction to the user to manipulate the series of images 1422 of the challenge user interface 1400 until an image 1422 is found that matches a challenge key 1414. In some embodiments, challenge request area 1410 and the challenge text 1412 may be omitted, in which case, it may be left to the user to deduce the nature of the challenge from the challenge key 1414 and the series of images 1422.

The challenge key 1414 illustrates a key shape 1416 and a key number 1418. The key number 1418 may be a graphical representation of an integer (0, 1, 2, 3, etc.) and the key shape 1416 may be a stylish shape, icon, or other representation of a graphical element. In FIG. 14A, the key number 1418 is illustrated as '2' and the key shape 1416 is illustrated as a pair of shoes.

Each of the plurality of images 1422 may include a combination of two or more shapes 1433. For example, in FIG. 14A, the image 1422 has one first shape 1433A (a pair of shoes) and two second shapes 1433B (a paint can). The shapes 1433 illustrated in FIG. 14A are merely examples, and are not intended to limit the embodiments of the present disclosure. Though only two different types of shapes 1433 are illustrated in FIG. 14A, it will be understood that more, or fewer, may be present in different ones of the images 1422.

To match the challenge key 1414, the user is to identify one or more of the plurality of images 1422 that include a same number of shapes 1433 matching the key shape 1416 as the key number 1418. For example, in the illustration of FIG. 14A, a correct image 1422 will include two representations of a shape 1433 that matches the pair of shoes (e.g., first shape 1433A) of the key shape 1416.

Each of the plurality of images 1422 may include one or more, or none, of shapes 1433 that match the key shape 1416. Each of the plurality of images 1422 may also include one or more other shapes 1433 that do not match the key shape 1416. For example, the image 1422 of FIG. 14A includes two shapes 1433B that are representations of a paint can. To correctly answer the challenge text 1412, the user must select an image 1422 that not only has a shape 1433A that match the key shape 1416, but also the correct number of the shape 1433A that matches the key number 1418. In the example of FIG. 14A, the image 1422 does not match the challenge key 1414, because the image 1422 only has a single representation of the shoe shape (shape 1433A).

Figure 14B:
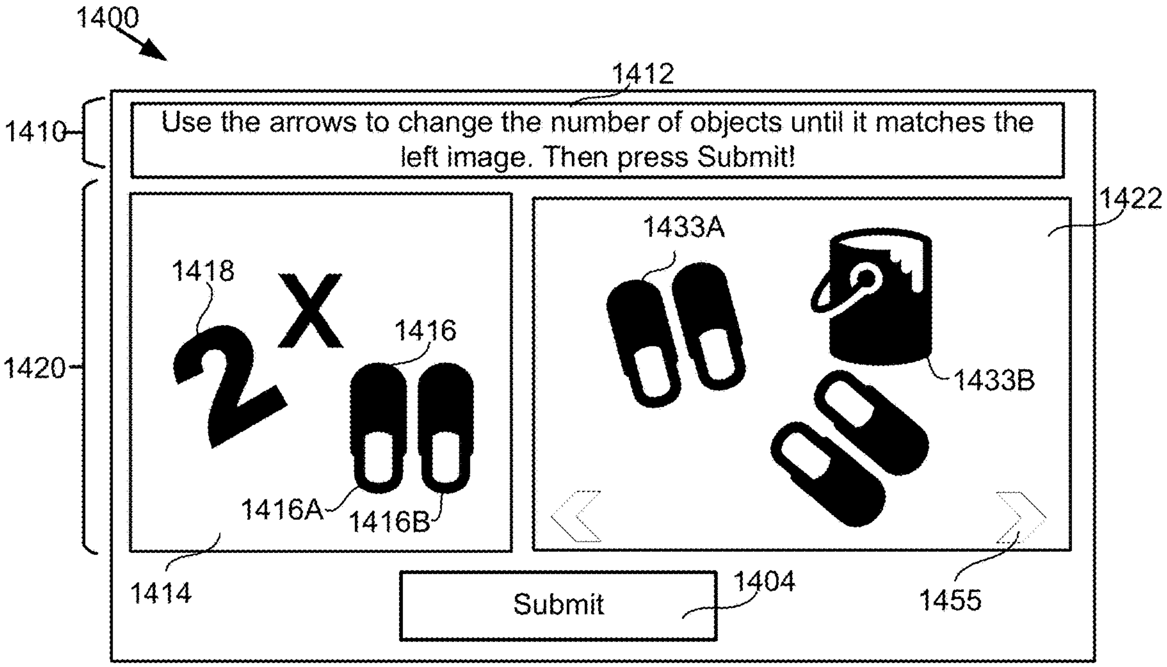
FIG. 14B illustrates an example of the challenge user interface after the user has interacted with the image control interface, in accordance with some embodiments of the present disclosure.

FIG. 14B illustrates an example of the challenge user interface 1400 after the user has interacted with the image control interface 1455, in accordance with some embodiments of the present disclosure. A description of elements of FIG. 14B that have been previously described will be omitted for brevity. Selecting the image control interface 1455 may advance through the images 1422, displaying a different image 1422 from that of FIG. 14A.

Referring to FIG. 14B, the image 1422 that is displayed matches the challenge key 1414. Namely, the image 1422 contains two of the first shape 1433A that match the shoe icon of the key shape 1416, which matches the key number 1418. Upon detecting the correctness of the image 1422, the user may select the submit button 1404 to submit the image 1422 as the solution to the challenge text 1412.

While simple to operate, the challenge user interface 1400 may be difficult to defeat using machine learning. Solving the challenge successfully may utilize recognition both of the shape involved and the number of combinations of the shape that are required, as well as discounting other shapes that may be present in the images 1422, which may be difficult for training in a machine learning environment. Moreover, generation of many iterations of the challenge user interface 1400 may be fairly straightforward. The challenge designer may generate a plurality of different shapes 1433, and new challenges may be generated by selecting one of the shapes 1433 as the key shape 1416, along with an integer for the key number 1418. The challenge images 1422 may be generated relatively quickly by selecting two or more of the plurality of different shapes 1433, and placing different numbers of the different shapes 1433 on different images 1422, with one of the images 1422 having the correct key number 1418 of the key shape 1416. Thus, little work may be required to generate a large number of images 1422 and/or challenge user interfaces 1400.

Moreover, in some embodiments, the key shape 1416 and/or the plurality of shapes 1433 may be selected such that they incorporate a number of sub-shapes 1416A, 1416B. For example, as illustrated in FIG. 14B, the key shape 1416 may include a first sub-shape 1416A and a second sub-shape 1416B. For example, the key shape 1416 may be a pair of shoes made up of a first sub-shape 1416A of a first shoe and a second sub-shape 1416B of a second shoe. While a user may easily recognize the pair of shoes as a single element (e.g., a single key shape 1416), some types of machine learning may have difficulty recognizing the pairing of the sub-shapes 1416A, 1416B.

As described, successfully answering the challenge user interface 1400 may involve recognizing a matching shape 1433A that matches the key shape 1416 from a plurality of shapes 1433. However, the notion of "matching" does not necessarily require an exact and/or identical match for successful completion of the challenge. For example, in some embodiments, the challenge user interface 1400 may take advantage of a user's ability to detect shapes 1433 that match the key shape 1416 despite variations between the two elements.

Figure 14C:
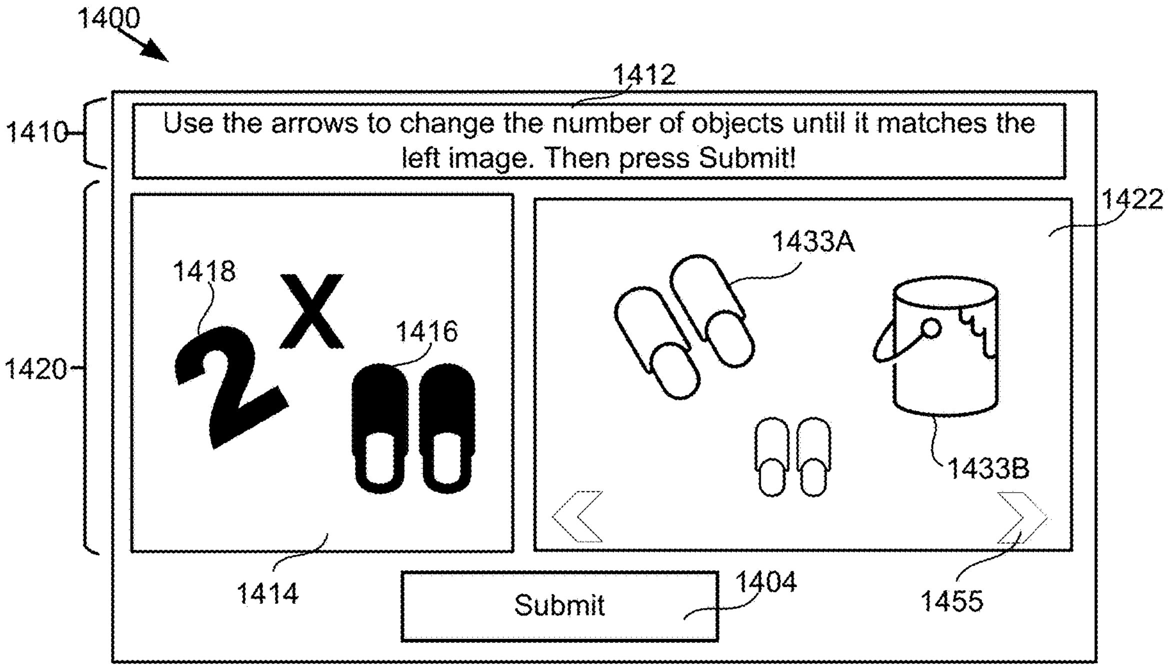
FIG. 14C illustrates an example of the challenge user interface in which the shapes utilize different coloring and/or shading from the key shape, in accordance with some embodiments of the present disclosure.

FIG. 14C illustrates an example of the challenge user interface 1400 in which the shapes 1433 utilize different coloring and/or shading from the key shape 1416, in accordance with some embodiments of the present disclosure. A description of elements of FIG. 14C that have been previously described will be omitted for brevity.

In the example of FIG. 14C, the shapes 1433 are illustrated having an inverse and/or different coloring from the key shape 1416. As an example, the key shape 1416 is illustrated as being a shape filled with a black color, while the first shape 1433A may include white portions outlined in black. Despite having a different coloring, the arrangement of the first shapes 1433A may be considered to match the key shape 1416 as long as the same number of the first shapes 1433A are present (in this case, two) as indicated by the key number 1418. Though both of the first shapes 1433A have the same shading/coloring in FIG. 14C, the embodiments of the present disclosure are not limited to such a configuration. In some embodiments, each of the first shapes 1433A may have a different coloring and/or shading from one another.

The use of a different shading and/or coloring allows for a number of solution combinations to be generated quickly. For example, a plurality of different configurations of the key shape 1416 and/or the shapes 1433 may be utilized for different configurations of the shapes 1433 by varying a coloring and/or shading. Nonetheless, a human user is able to determine which of the shapes 1433 correctly matches the key shape 1416, such that the user may focus on whether the correct number (the key number 1418) of the shapes 1433 are present. The differences in coloration and/or shading may cause difficulty, however, for a machine learning algorithm attempting to automatically detect the first shape 1433A as matching the key shape 1416.

Figure 14D:
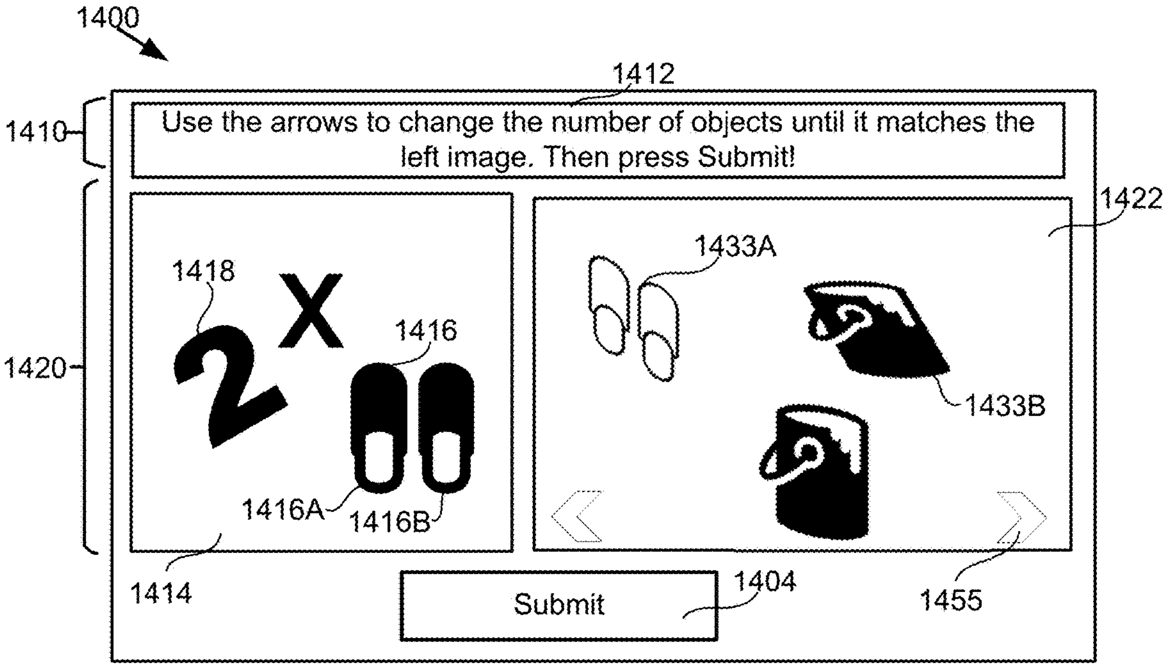
FIG. 14D illustrates an example of the challenge user interface in which the shapes are distorted with respect to the key shape, in accordance with some embodiments of the present disclosure.

Other variations between the shapes 1433 and the key shape 1416 are possible without deviating from the embodiments of the present disclosure. FIG. 14D illustrates an example of the challenge user interface 1400 in which the shapes 1433 are distorted with respect to the key shape 1416, in accordance with some embodiments of the present disclosure. A description of elements of FIG. 14D that have been previously described will be omitted for brevity.

In the example of FIG. 14D, the shapes 1433 are illustrated having distorted shape from the key shape 1416. As an example, the first shape 1433A and/or the second shape 1433B may be stretched, shrunk, enlarged, twisted, and/or other variations, such that the shape 1433, while retaining a same general relation to the key shape 1416A, may still have a different outline and/or size. For example, one or more of the first and second shapes 1433A, 1433B may be twisted in one or more dimensions and/or skewed in comparison to the key shape 1416. In some embodiments, each of the first shapes 1433A may have a different variation and/or outline from one another.

As with the shading/coloration variations, the use of distortion allows for a number of solution combinations to be generated quickly. For example, a number of different variations of a first shape 1433A may be generated by running the first shape 1433A through a computer program that varies aspects of the first shape 1433A. For example, the computer program may be configured to generate random minor distortions to the first shape 1433A. Nonetheless, a human user is able to determine which of the shapes 1433 correctly matches the key shape 1416, such that the user may focus on whether the correct number (the key number 1418) of the shapes 1433 are present. The differences in shape may cause difficulty, however, for a machine learning algorithm attempting to automatically detect the first shape 1433A as matching the key shape 1416.

Figure 14E:
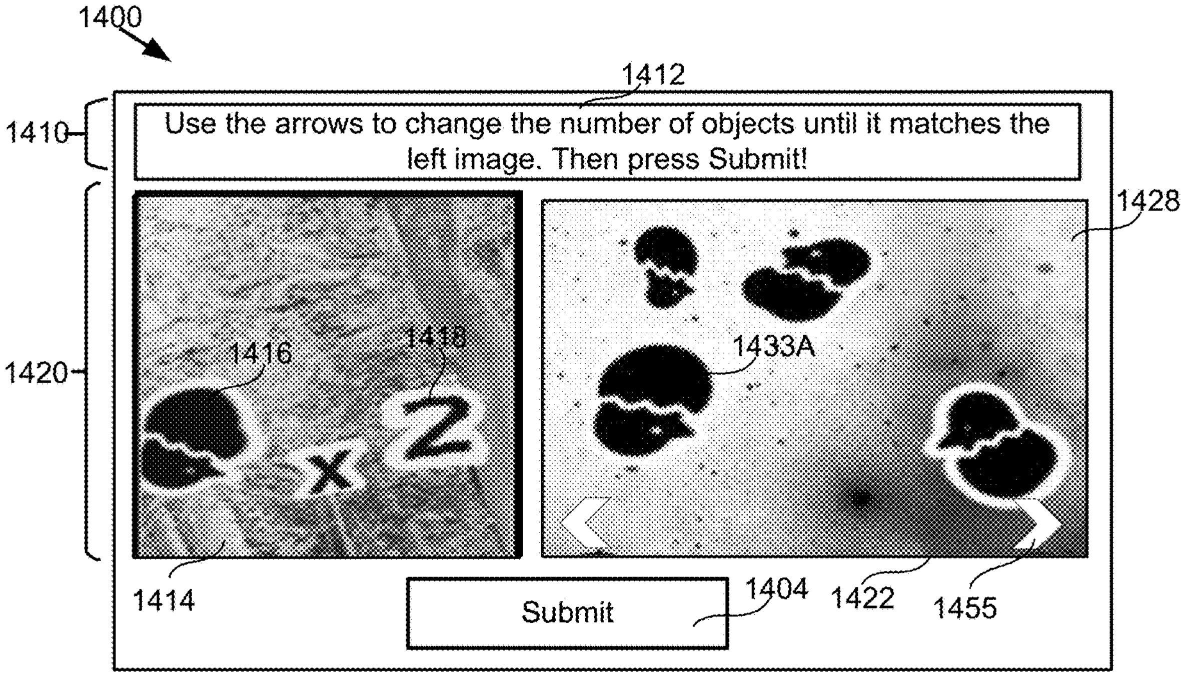
FIG. 14E illustrates an example of the challenge user interface in which a background image is utilized, in accordance with some embodiments of the present disclosure.

In some embodiments, additional elements may be incorporated into the challenge user interface 1400 to aid in defeating machine learning. FIG. 14E illustrates an example of the challenge user interface 1400 in which a background image 1428 is utilized, in accordance with some embodiments of the present disclosure. A description of elements of FIG. 14E that have been previously described will be omitted for brevity.

Referring to FIG. 14E, the challenge response area 1420 may further include a background 1428 applied to each of the images 1422 as well as the challenge key 1414. In some embodiments, the background 1428 may be configured to utilize a plurality of colors and/or a plurality of shades of a same color. For example, in some embodiments, the background image 1428 may include a plurality of grayscale shades. In some embodiments, the background 1428 applied to one or more of the images 1422 may be different from a background 1428 applied to the challenge key 1414.

In some embodiments, the background 1428 may be configured to surround one or more of the shapes 1433. The use of the background 1428 may further defeat machine learning algorithms. In some cases, machine learning training operations may base shape recognition on the presence of white space around a particular area of an image. By reducing the amount of whitespace, and varying a shade and/or color of the background 1428, it may be more difficult for a machine learning algorithm to learn to identify the shapes 1433 of the images 1422. It will be understood that different colors, shadings, patterns, and the like may be utilized for the background 1428.

Figure 15:
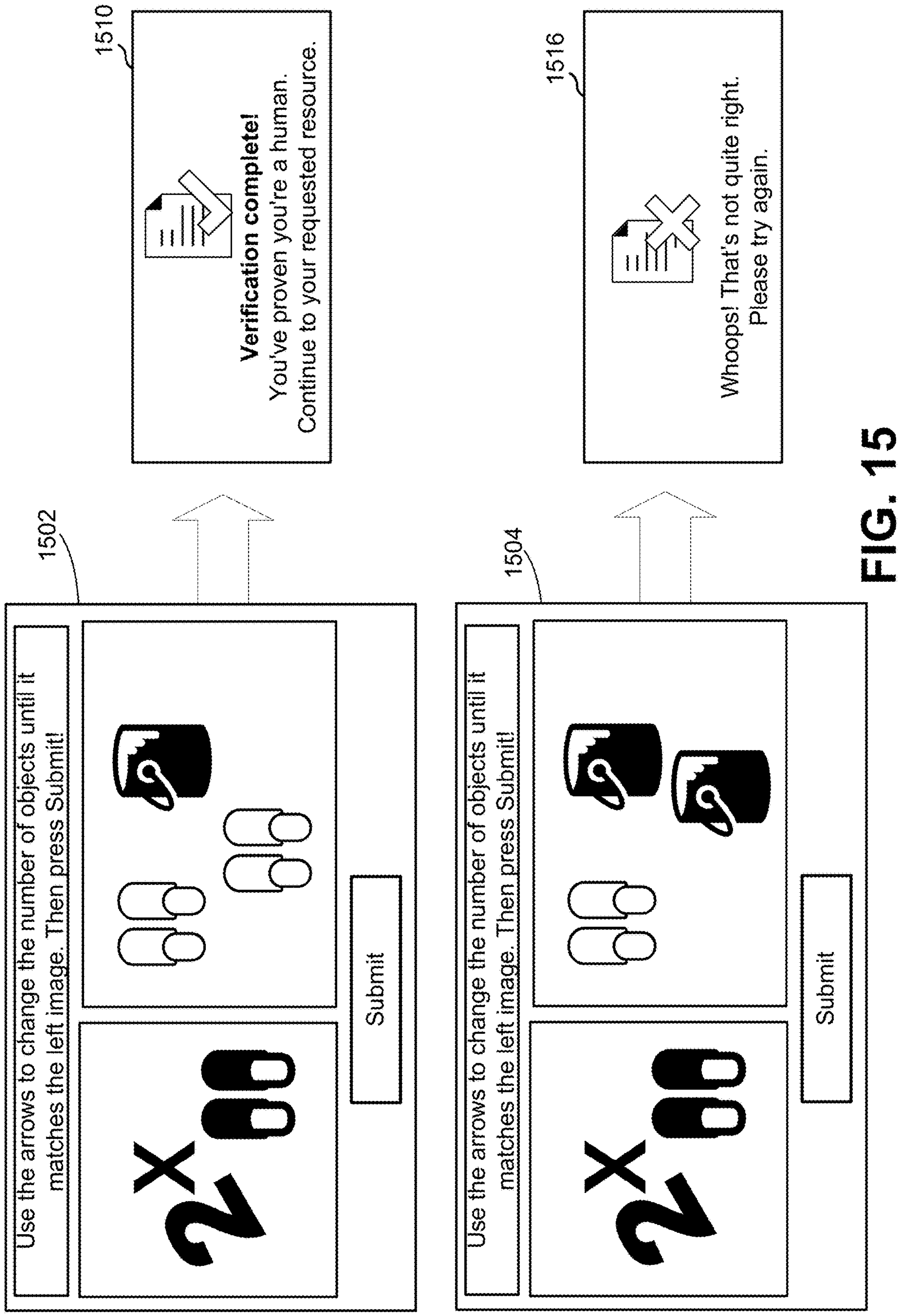
FIG. 15 depicts an example of an operation of checking user responses, according to some embodiments of the present disclosure.

FIG. 15 depicts an example of an operation of checking user responses, according to some embodiments of the present disclosure. A challenge creation system may be used to create challenges that are to be presented to users. The challenge creation system may include a 3D modelling system that performs tasks that enable a challenge creator to create, manipulate, and render virtual objects in creating the challenges. A challenge may be stored electronically as a data object (e.g., a CDO, as described herein) having structure, such as program code, images, parameters for their use, etc. The challenge server may be provided a set of these data structures and serve them up as requested.

In the illustration of FIG. 15, a challenge presentation may be in the form of challenge image 1502, in which the user is expected to select an image that matches the challenge key. A response to that selection may be the success message 1510. On the other hand, if the user is presented with a challenge presentation in the form of challenge image 1504, and the user points to and selects an image that does not contain the correct number of shapes matching the challenge key, the user may receive a fail message 1516 and, in some embodiments, may be allowed to try again.

In some embodiments, the challenge creation system can create a large number of different challenges from small variations. By being able to create a large number of distinct challenges from a single class, the ratio of effort by challenge creators and users can be kept low. Ideally, the variations of the challenges are not such that a computer process can easily process any one of those to guess the correct human expectation of the challenge.

A challenge creator, such as a 3D artist, puzzle maker, or other challenge creator, may use a modelling program to create one or more virtual objects and give each one various visual properties, for example shape, texture, shading, and/or coloring. A challenge creator may give each virtual object some simulated physical properties, for example flexibility, bounciness, transparency, weight, and friction. The challenge creator can then use the modelling program to create a virtual scene in which various virtual objects can be placed and manipulated. The challenge creator can use the modelling program to create a virtual camera that surveys the virtual scene. The camera may be in an arbitrary position and aimed in an arbitrary direction, within constraints specified by the challenge creator.

The challenge creator can use the modelling program to create virtual lights that light up the virtual scene and the virtual objects within it, producing shades of color and texture, shadows, highlights, and reflections. The lights may be in arbitrary positions and aimed in an arbitrary direction, perhaps within constraints specified by the challenge creator.

The challenge creator can direct the modelling program to render a series of images (2D or otherwise) that are captured by the virtual camera, showing the virtual objects in the virtual scene lit by the virtual lights. The images can represent a sequence over time, so that as the objects move, each image shows the objects in a different position. This rendering process produces an animated image sequence comprising one or more frames, each frame rendered in sequence over time. The modelling program can also produce a list of properties that the virtual objects have.

A challenge may comprise a presentation (what is to be shown to the user), a model from which the presentation is generated, possibly input parameters for varying what is generated from the model, a set of human expectations that are generated from the model (and are likely determinable from the model but not readily determinable from the presentation without the addition of human mental processing), a criterion related to the presentation, and what would constitute a correct response. The input parameters may be selected from a set of possible input values. A criterion may comprise a prompt or a question (e.g., challenge text 1412), whether explicit or implicit, that is provided to the user along with the presentation and to which the user is expected to respond to. In operation, a challenge generator may generate a challenge from a known model for a class of challenges, having a known correct response that corresponds to the known set of human expectations about the model, so that a challenge processor can easily evaluate whether a user's response is consistent with the presentation and the criterion. The known correct response, or range of acceptable responses, may be stored in a data element referred to as an answer key. The answer key typically is not available to the user device in a computer processable form but may be easily determined by a human with real-world experience. An answered challenge may be represented by a data structure that comprises the elements of the challenge and the user response to the criterion.

The criterion could be in one or more of various forms. For example, for some challenges, the presentation may be a plurality of images, the model used for generating the images obtains shapes that match a particular challenge key, a first parameter may be a key shape to be included for a correct image, a second parameter of the challenge data object may be a number of the key shape to be included for the correct image, the criterion is a representation of which of the images have the shapes in a correct orientation (e.g., a key number of shapes matching the key shape) that matches the challenge key, a prompt is "Select which of these images matches the challenge key", and the known correct response is an indication of which of the images match the challenge key. A shape may be a sub-image, such that the presentation image shown to the user comprises a plurality of sub-images that are combined into one image. In some embodiments, the challenge data object data that the user device receives does not have a clear indication of boundaries between images, and that may be left to the user to discern, as needed.

For example, a challenge creation routine may generate a challenge based on a random or arbitrary input number selected from an input set and a model, wherein each selected input number may generate a challenge with a different answer, but all based on the same model. For example, the model may have two shapes, and the challenge generation may generate different sets of the two shapes and/or move one or more of the shapes to different defined positions of the other shapes to generate the challenge image.

Figure 16:
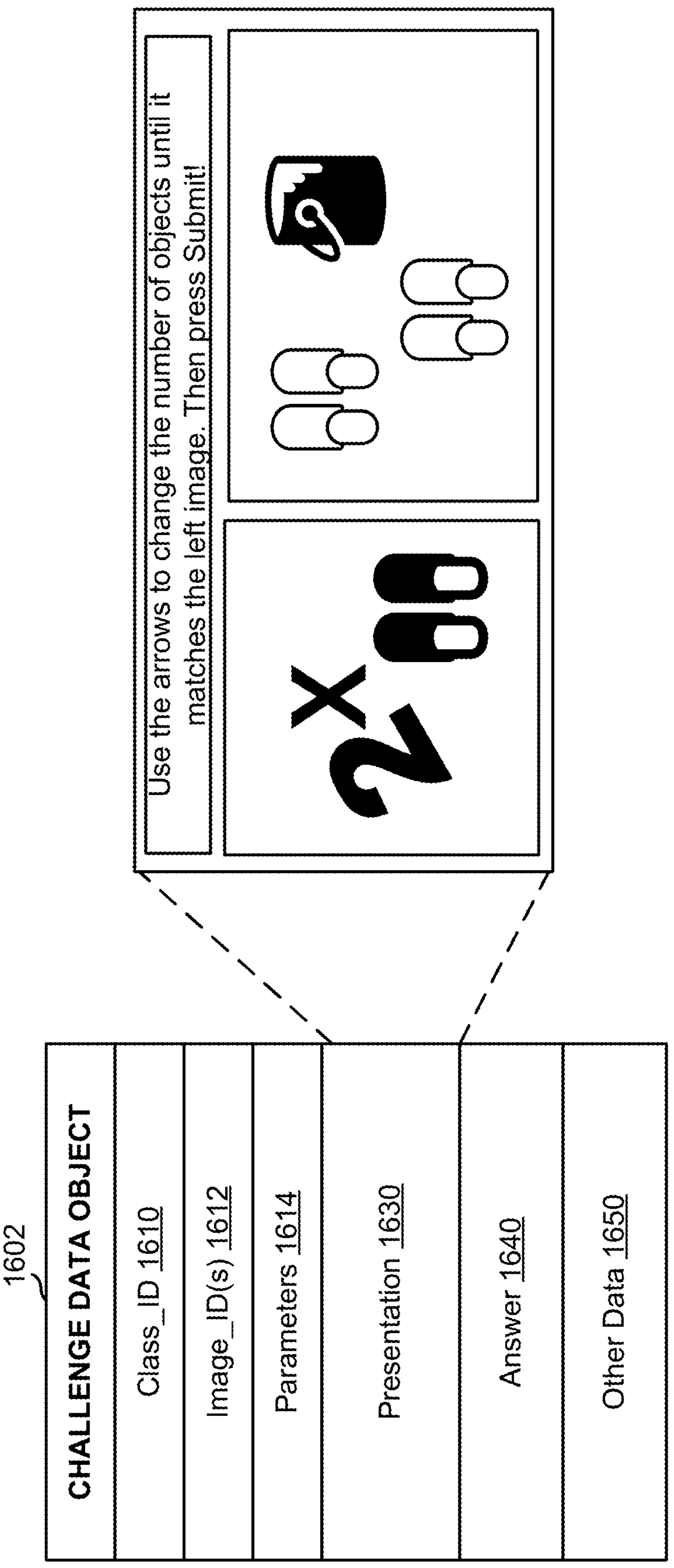
FIG. 16 illustrates an example of a challenge data object, showing an image that may be presented to a user device, data fields indicating criteria to be applied to the image, and other data, according to some embodiments of the present disclosure.

FIG. 16 illustrates an example of a challenge data object 1602, showing an interface that may be presented to a user device, images that may be a part of the interface, data fields indicating properties of the images, and other data. The components of the challenge data object 1602 illustrated in FIG. 16 are merely an example, and, in some embodiments, fewer, more, or different components may be present without deviating from the embodiments of the present disclosure. The challenge data object 1602 may be similar to the CDO 222, 322, 522, 1022, and 1322 described herein.

The challenge data object 1602 may include one or more image ID(s) (Image_ID) 1612 that specify one or more images (e.g., such as images 1422 of FIGS. 14A to 14E) included in the challenge presentation. The challenge data object 1602 may also include a class ID (Class_ID) 1610 that describes the type of challenge and how the challenge is to be processed. For example, the class ID 1610 may indicate that the nature of the challenge is to identify images having arrangement of a first shape in the images as a challenge key. The challenge data object 1602 may also include a parameters description 1614 that describes characteristics of the one or more images and/or the challenge represented by the challenge data object 1602.

The challenge data object 1602 can also include a presentation 1630. The presentation 1630 may indicate how a user interface (e.g., challenge user interface 1400 of FIGS. 14A to 14E) is to be illustrated from the one or more images of the image ID(s) 1612. For example, in some embodiments, a plurality of images may be included as part of the presentation 1630, as in FIGS. 14A to 14E. In some embodiments, one of the images may be illustrated at a time, though embodiments of the present disclosure are not limited to such a configuration.

In some embodiments, the presentation 1630 may include a criterion in the form of a question. A question may be in the form of a selection ("Select an image that matches the challenge key."), may be asking about a property of what is depicted in a presentation 1630, may be about the correctness of what is depicted in a presentation, etc. The question of the criterion may, in some embodiments, be utilized to form the challenge text 1412 illustrated in FIGS. 14A to 14E.

The challenge data object 1602 can also include an answer key 1640. The answer key 1640 may be a separate data field that describes which of the one or more images is (or are) the correct answer to the presentation 1630. The answer key 1640 may be based on the shapes included in the images as well as the challenge text of the presentation 1630. In some embodiments, the challenge data object 1602 may include other data 1650 that may be used as part of generating the challenge and/or the challenge user interface.

In some embodiments, the challenge data object 1602 is generated by a computer from a source, such as a 3D model or other data, and lacks or obscures source data, as can happen when a 3D virtual scene is represented only by an image of the virtual scene, and that source data that is lacking or obscured data is of the nature that it could be expected that an authorized human user would be able to fill in that lacking or obscured data, at least more easily than an unauthorized human user or an unauthorized bot.

The challenge data object 1602 may comprise images (which may, in some embodiments, be utilized to form the images 1422 illustrated in FIGS. 14A to 14E), properties associated with each image, and the shapes associated with the images. The challenge data object 1602 can include the presentation 1630, at least one image associated with the property of being a correct answer to the presentation 1630, and at least one image associated with the property of being an incorrect answer to the presentation 1630. The challenge server can associate each image with a unique image ID 1612. The challenge server can store each image ID 1612, associated with the list of properties of the image, in the answer key 1640 for the challenge data object 1602, which references which image ID(s) 1612 are associated with images that satisfy the challenge key and therefore are correct, and which image ID(s) 1612 are associated with images that do not satisfy the presentation 1630 and therefore are incorrect. The challenge server may assemble the challenge data object 1602. The challenge server may send to the user device the challenge, or part thereof, omitting the answer key 1640 and possibly other elements.

Upon receipt of the challenge data object 1602, the user device may be configured to display to the user the presentation 1630 and/or the images of a challenge. For example, the challenge user interfaces 1400 illustrated in FIGS. 14A to 14E may be generated from the challenge data object 1602.

A user may operate an interface of the user device to choose which one or more images satisfy the challenge key. The user device can then send the image ID(s) 1612 of the selected images to the challenge server. The challenge server can compare the image ID(s) 1612 chosen by the user to the answer key 1640. The challenge server can determine whether the user should receive the service of value (such as access to computer resources) from the value server, and whether the user should complete a new challenge. The determination may be based on whether the user chose images that satisfied the challenge key. The challenge server can additionally send a request to the decision server, including the number of correct images the user selected, and the decision server can respond with a new decision. The challenge server can again determine whether the user should receive the value from the value server, and whether the user must complete a new challenge. If the challenge server determines that the user must complete a new challenge, the above process can be repeated. If the challenge server determines that the user should receive the value from the value server, the challenge server can send a directive to the user device that the user device request from the value server the service of value. The challenge server can store information about the challenge, the user, and the determination whether the challenge was successfully completed or not.

The user device can send to the value server a set of validation data describing the challenge and a request that the value server issue the service of value to the user device. The value server sends to the challenge server the validation data. The challenge server compares the validation data to information stored about the challenge and the user, and as a result determines whether the validation data is authentic. If the validation data is authentic, the challenge server replies to the value server that the validation data is authentic. The value server can then decide to issue the service of value to the user device. If so decided, the user receives the service of value.

In a specific embodiment, a system for user authentication includes an authentication server, the authentication server including a processor coupled to a memory, the memory including program code instructions configured to cause the processor to present an authentication challenge to a user of a computing device, the authentication challenge including a number of challenge elements; receive a response to the authentication challenge from the user, the response including a selection of one or more challenge elements in accordance with an instruction to the user on how to complete the authentication challenge; notify the user whether the user's choice of challenge element correctly complied with the instruction or not; and if the user correctly complied with the instruction, allow the user to perform a computer operation.

A computing device for user authentication may include a processor coupled to a memory, the memory including program code instructions configured to cause the processor to present an authentication challenge to a user of a computing device, the authentication challenge including a number of challenge elements; receive a response to the authentication challenge from the user, the response including a selection of one or more challenge elements in accordance with an instruction to the user on how to complete the authentication challenge; notify the user whether the user's choice of challenge element correctly complied with the instruction or not; and if and only if the user's correctly complied with the instruction, allow the user to perform a computer operation.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 17:
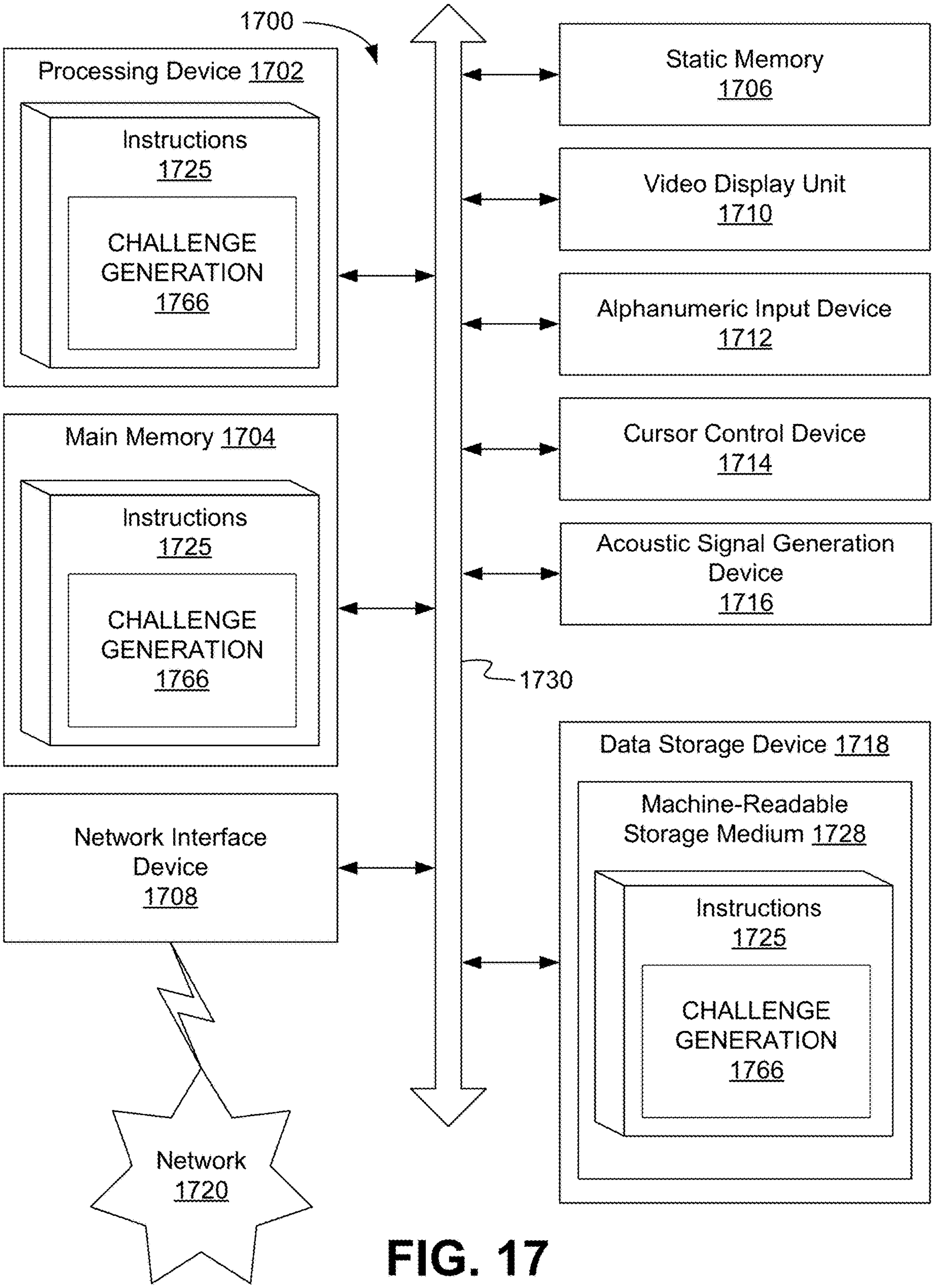
FIG. 17 is a block diagram of an example computing device that may perform one or more of the operations described herein, in accordance with some embodiments of the present disclosure.

FIG. 17 is a block diagram of an example computing device 1700 that may perform one or more of the operations described herein, in accordance with one or more aspects of the disclosure. Computing device 1700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1700 may include a processing device (e.g., a general purpose processor, a PLD, etc.) 1702, a main memory 1704 (e.g., synchronous dynamic random access memory (DRAM), read-only memory (ROM)), a non-volatile memory 1706 (e.g., flash memory and a data storage device 1718), which may communicate with each other via a bus 1730.

Processing device 1702 may be provided by one or more general-purpose processing devices such as a microprocessor, central processing unit, or the like. In an illustrative example, processing device 1702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1702 may also include one or more special-purpose processing devices such as an application specific integrated circuit (ASIC), a field programmable gate array (FPGA), a digital signal processor (DSP), network processor, or the like. The processing device 1702 may execute the operations described herein, in accordance with one or more aspects of the present disclosure, for performing the operations discussed herein.

Computing device 1700 may further include a network interface device 1708 which may communicate with a network 1720. The computing device 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse) and an acoustic signal generation device 1716 (e.g., a speaker). In one embodiment, video display unit 1710, alphanumeric input device 1712, and cursor control device 1714 may be combined into a single component or device (e.g., an LCD touch screen).

Data storage device 1718 may include a computer-readable storage medium 1728 on which may be stored one or more sets of instructions 1725 that may include instructions for a multiplier configuration component, e.g., challenge generation 1766 for carrying out the operations described herein, in accordance with one or more aspects of the present disclosure. Instructions 1725 may also reside, completely or at least partially, within main memory 1704 and/or within processing device 1702 during execution thereof by computing device 1700, main memory 1704 and processing device 1702 also constituting computer-readable media. The instructions 1725 may further be transmitted or received over a network 1720 via network interface device 1708.

Figure 18:
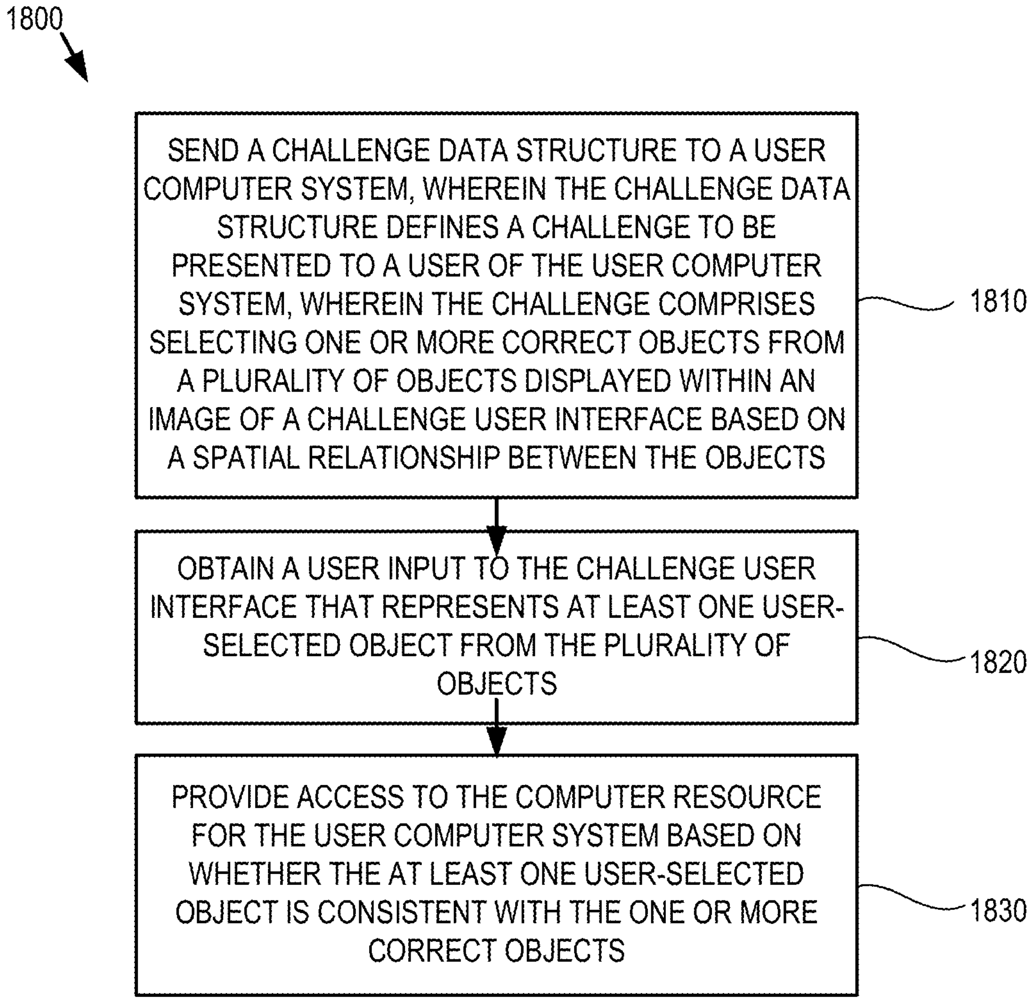
FIG. 18 is a flow diagram of a method for securing a computer resource against unauthorized access by a user computer system attempting to access the computer resource, in accordance with some embodiments of the present disclosure.

FIG. 18 is a flow diagram of a method 1800 for securing a computer resource against unauthorized access by a user computer system attempting to access the computer resource, in accordance with some embodiments of the present disclosure. Method 1800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1800 may be performed by a computing device (e.g., authentication challenge system 206, 306, 406, 506. 606 illustrated in FIGS. 2, 3, 4, 5, 6).

With reference to FIG. 18, method 1800 illustrates example functions used by various embodiments. Although specific function blocks ("blocks") are disclosed in method 1800, such blocks are examples. That is, embodiments are well suited to performing various other blocks or variations of the blocks recited in method 1800. It is appreciated that the blocks in method 1800 may be performed in an order different than presented, and that not all of the blocks in method 1800 may be performed.

Referring simultaneously to the prior figures as well, the method 1800 begins at block 1810, in which a challenge data structure is sent to a user computer system. The challenge data structure defines a challenge to be presented to a user of the user computer system. The challenge comprises selecting one or more correct objects from a plurality of objects displayed within an image of a challenge user interface based on a spatial relationship between the objects. In some embodiments, the one or more objects may correspond to the sub-images 826 as described herein with respect to FIGS. 8A to 8C. In some embodiments, the challenge user interface may correspond to one or more of the challenge user interfaces 800, 800', 800" described herein with respect to FIGS. 8A to 8C.

At block 1820, a user input to the challenge user interface is obtained that represents at least one user-selected object from the plurality of objects. In some embodiments, the user-selected object may be indicated by a user action with respect to one of the more of the plurality of objects of the image of the challenge user interface.

At block 1830, access is provided to a computer resource for the user computer system based on whether the at least one user-selected object is consistent with the one or more correct objects. In some embodiments, the access to the computer resource may comprise data from a value server 204, 304, as described herein with respect to FIGS. 2 and 3.

Figure 19:
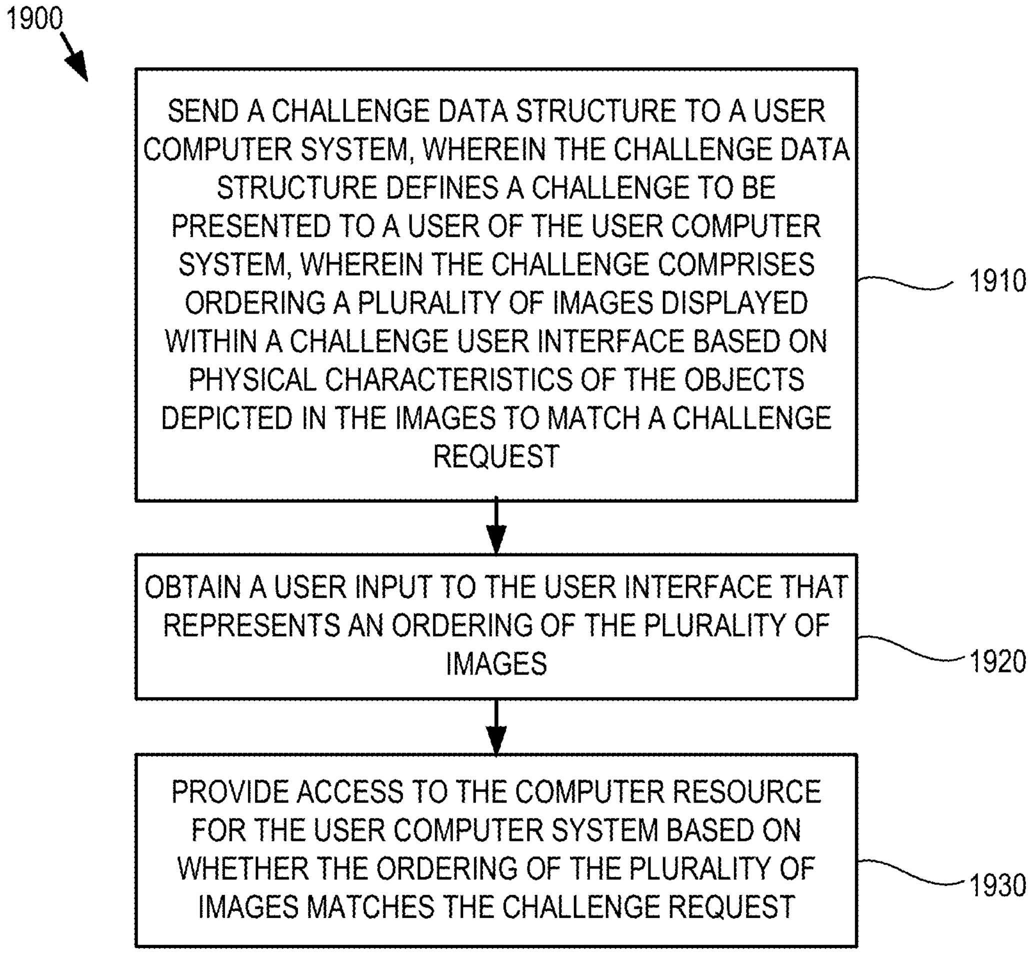
FIG. 19 is a flow diagram of a method for securing a computer resource against unauthorized access by a user computer system attempting to access the computer resource, in accordance with some embodiments of the present disclosure.

FIG. 19 is a flow diagram of a method 1900 for securing a computer resource against unauthorized access by a user computer system attempting to access the computer resource, in accordance with some embodiments of the present disclosure. Method 1900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1900 may be performed by a computing device (e.g., authentication challenge system 206, 306, 406, 506. 606 illustrated in FIGS. 2, 3, 4, 5, 6).

With reference to FIG. 19, method 1900 illustrates example functions used by various embodiments. Although specific function blocks ("blocks") are disclosed in method 1900, such blocks are examples. That is, embodiments are well suited to performing various other blocks or variations of the blocks recited in method 1900. It is appreciated that the blocks in method 1900 may be performed in an order different than presented, and that not all of the blocks in method 1900 may be performed.

Referring simultaneously to the prior figures as well, the method 1900 begins at block 1910, in which a challenge data structure is sent to a user computer system. The challenge data structure defines a challenge user interface to be presented to a user of the user computer system. The challenge comprises ordering a plurality of images displayed within a challenge user interface based on physical characteristics of the objects depicted in the images to match a challenge request. In some embodiments, the plurality of images may correspond to the images 1102 as described herein with respect to FIGS. 11A to 11E. In some embodiments, the challenge user interface may correspond to one or more of the challenge user interfaces 1100, 1100', 1100", 1100'", 1100"" described herein with respect to FIGS. 11A to 11E. In some embodiments, the challenge request may correspond to the challenge text 1112 described herein with respect to FIGS. 11A to 11E.

At block 1920, a user input to the user interface is obtained that represents an ordering of the plurality of images. In some embodiments, the ordering may be indicated by a user action with respect to one of the more of the plurality of images of the challenge user interface.

At block 1930, access is provided to a computer resource for the user computer system based on whether the ordering of the plurality of images matches the challenge request. In some embodiments, the access to the computer resource may comprise data from a value server 204, 304, as described herein with respect to FIGS. 2 and 3.

Figure 20:
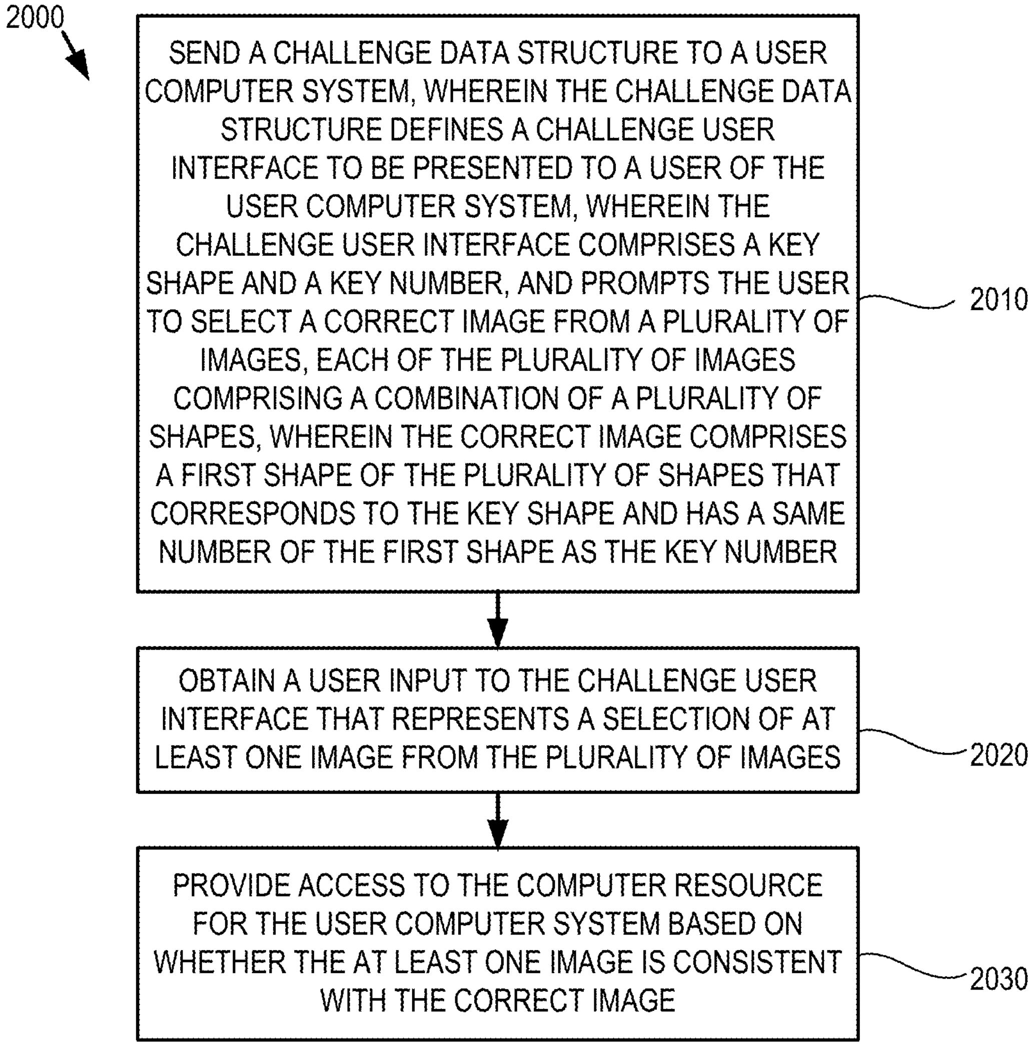
FIG. 20 is a flow diagram of a method for securing a computer resource against unauthorized access by a user computer system attempting to access the computer resource, in accordance with some embodiments of the present disclosure.

FIG. 20 is a flow diagram of a method 2000 for securing a computer resource against unauthorized access by a user computer system attempting to access the computer resource, in accordance with some embodiments of the present disclosure. Method 2000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 2000 may be performed by a computing device (e.g., authentication challenge system 206, 306, 406, 506. 606 illustrated in FIGS. 2, 3, 4, 5, 6).

With reference to FIG. 20, method 2000 illustrates example functions used by various embodiments. Although specific function blocks ("blocks") are disclosed in method 2000, such blocks are examples. That is, embodiments are well suited to performing various other blocks or variations of the blocks recited in method 2000. It is appreciated that the blocks in method 2000 may be performed in an order different than presented, and that not all of the blocks in method 2000 may be performed.

Referring simultaneously to the prior figures as well, the method 2000 begins at block 2010, in which a challenge data structure is sent to a user computer system. The challenge data structure defines a challenge user interface to be presented to a user of the user computer system. The challenge user interface comprises a key shape and a key number, and prompts the user to select a correct image from a plurality of images, each of the plurality of images comprising a combination of a plurality of shapes, wherein the correct image comprises a first shape of the plurality of shapes that corresponds to the key shape and has a same number of the first shape as the key number. In some embodiments, the key shape and the key number may correspond to the key shape 1416 and the key number 1418, respectively, as described herein with respect to FIGS. 14A to 14E. In some embodiments, the plurality of images may correspond to images 1422, as described herein with respect to FIGS. 14A to 14E. In some embodiments, the plurality of shapes may correspond to shapes 1433, as described herein with respect to FIGS. 14A to 14E. In some embodiments, the challenge user interface may correspond to one or more of the challenge user interfaces 1400 described herein with respect to FIGS. 14A to 14E.

In some embodiments, the key shape comprises two or more copies of a sub-shape. The sub-shape may correspond to sub-shapes 1416A and 1416B, described herein with respect to FIG. 14B. In some embodiments, each of the plurality of images comprises a background, the background comprising a plurality of shades of a color. The background may correspond to background 1428, described herein with respect to FIG. 14E. In some embodiments, the first shape has a different color than the key shape, a different shading than the key shape, and/or a distorted outline from the key shape. In some embodiments, the challenge user interface further comprises a challenge key comprising the key shape and the key number. In some embodiments, the challenge key may correspond to the challenge key 1414 described herein with respect to FIGS. 14A to 14E. In some embodiments, at least one of the plurality of images comprises a first quantity of the first shape that is different from the key number and a second quantity of a second shape that is different from the first shape. In some embodiments, the first and second shapes may correspond to the first shape 1433A and the second shape 1433B, described herein with respect to FIGS. 14A to 14E.

At block 2020, a user input to the user interface is obtained to the challenge user interface that represents a selection of at least one image from the plurality of images. In some embodiments, the challenge user interface further comprises an image control interface configured to allow the user to advance through the plurality of images. In some embodiments, the image control interface may correspond to the image control interface 1455 described herein with respect to FIGS. 14A to 14E.

At block 1430, access is provided to a computer resource for the user computer system based on whether the at least one image is consistent with the correct image. In some embodiments, the access to the computer resource may comprise data from a value server 204, 304, as described herein with respect to FIGS. 2 and 3.

While computer-readable storage medium 1728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "sending," "obtaining," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the term "and/or" includes any and all combinations of one or more of the associated listed items. As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, the method comprising:

sending, to a user computer system, a dataset indicating an attempt by a user of the user computer system to solve a challenge data structure;

receiving, from the user computer system, the dataset;

generating, based on the dataset, a challenge data structure defining a challenge user interface to prompt the user to select a correct image from a plurality of images, each of the plurality of images comprising a combination of a plurality of shapes, wherein the correct image comprises a first shape of the plurality of shapes that corresponds to a key shape and has a same number of the first shape as a key number, wherein the first shape has a randomly-generated distorted outline from the key shape;

sending, by a processing device, the challenge data structure to the user computer system to cause the challenge user interface to be presented to the user of the user computer system;

obtaining a user input to the challenge user interface that represents a selection of at least one image from the plurality of images;

receiving, from an authentication controller, a token request identifying a user session associated with the user computer system;

delaying, by the processing device and in response to receiving the token request, sending a token response to the authentication controller for a predetermined delay interval when a request for authenticated service has not been received from the user computer system;

receiving, from the user computer system, the request for authenticated service indicating that the user computer system asserts completion of the challenge;

after receiving the request for authenticated service, sending the token response to the authentication controller, the token response indicating whether the selection of the at least one image is consistent with the correct image; and providing, to the user computer system, access to a computer resource based on whether the at least one image is consistent with the correct image.

2. The method of claim 1, wherein the key shape comprises two or more copies of a sub-shape.

3. The method of claim 1, wherein each of the plurality of images comprises a background, the background comprising a plurality of shades of a color.

4. The method of claim 1, wherein the first shape has at least one of a different color than the key shape or a different shading than the key shape.

5. The method of claim 1, wherein the challenge user interface further comprises a challenge key comprising the key shape and the key number.

6. The method of claim 1, wherein the challenge user interface further comprises an image control interface configured to allow the user to advance through the plurality of images.

7. A computer system comprising:

a memory; and a processing device, operatively coupled to the memory, to:

send, to a user computer system, a dataset indicating an attempt by a user of the user computer system to solve a challenge data structure;

receive, from the user computer system, the dataset;

generate, based on the dataset, a challenge data structure defining a challenge user interface to prompt the user to select a correct image from a plurality of images, each of the plurality of images comprising a combination of a plurality of shapes, wherein the correct image comprises a first shape of the plurality of shapes that corresponds to a key shape and has a same number of the first shape as a key number, wherein the first shape has a randomly-generated distorted outline from the key shape;

send the challenge data structure to the user computer system to cause the challenge user interface to be presented to the user of the user computer system;

obtain a user input to the challenge user interface that represents a selection of at least one image from the plurality of images;

receive, from an authentication controller, a token request identifying a user session associated with the user computer system;

delay, by the processing device and in response to receiving the token request, sending a token response to the authentication controller for a predetermined delay interval when a request for authenticated service has not been received from the user computer system;

receive, from the user computer system, the request for authenticated service indicating that the user computer system asserts completion of the challenge;

after receiving the request for authenticated service, sending the token response to the authentication controller, the token response indicating whether the selection of the at least one image is consistent with the correct image; and provide, to the user computer, access to a computer resource based on whether the at least one image is consistent with the correct image.

8. The computer system of claim 7, wherein the key shape comprises two or more copies of a sub-shape.

9. The computer system of claim 7, wherein each of the plurality of images comprises a background, the background comprising a plurality of shades of a color.

10. The computer system of claim 7, wherein the first shape has at least one of a different color than the key shape or a different shading than the key shape.

11. The computer system of claim 7, wherein the challenge user interface further comprises a challenge key comprising the key shape and the key number.

12. The computer system of claim 7, wherein the challenge user interface further comprises an image control interface configured to allow the user to advance through the plurality of images.

13. A non-transitory computer-readable storage medium including instructions that, when executed by a processing device, cause the processing device to:

send, to a user computer system, a dataset indicating an attempt by a user of the user computer system to solve a challenge data structure;

receive, from the user computer system, the dataset;

generate, based on the dataset, a challenge data structure defining a challenge user interface to prompt the user to select a correct image from a plurality of images, each of the plurality of images comprising a combination of a plurality of shapes, wherein the correct image comprises a first shape of the plurality of shapes that corresponds to a key shape and has a same number of the first shape as a key number, wherein the first shape has a randomly-generated distorted outline from the key shape;

send, by the processing device, the challenge data structure to the user computer system to cause the challenge user interface to be presented to the user of the user computer system;

obtain a user input to the challenge user interface that represents a selection of at least one image from the plurality of images;

receive, from an authentication controller, a token request identifying a user session associated with the user computer system;

delay, by the processing device and in response to receiving the token request, sending a token response to the authentication controller for a predetermined delay interval when a request for authenticated service has not been received from the user computer system;

receive, from the user computer system, the request for authenticated service indicating that the user computer system asserts completion of the challenge;

after receiving the request for authenticated service, sending the token response to the authentication controller, the token response indicating whether the selection of the at least one image is consistent with the correct image; and provide, to the user computer system, access to a computer resource based on whether the at least one image is consistent with the correct image.

14. The non-transitory computer-readable storage medium of claim 13, wherein the key shape comprises two or more copies of a sub-shape.

15. The non-transitory computer-readable storage medium of claim 13, wherein each of the plurality of images comprises a background, the background comprising a plurality of shades of a color.

16. The non-transitory computer-readable storage medium of claim 13, wherein the first shape has at least one of a different color than the key shape or a different shading than the key shape.

17. The non-transitory computer-readable storage medium of claim 13, wherein the challenge user interface further comprises a challenge key comprising the key shape and the key number.

18. The non-transitory computer-readable storage medium of claim 13, wherein the challenge user interface further comprises an image control interface configured to allow the user to advance through the plurality of images.

* * * * *